(12) United States Patent
Hirsch

(10) Patent No.: US 11,880,196 B2
(45) Date of Patent: Jan. 23, 2024

(54) MULTI-SENSOR SUITE AND INTERACTIVE SOFTWARE PLATFORM FOR REAL-TIME VISUALIZATION AND ANALYSIS OF DISTRIBUTED ENVIRONMENT CONDITIONS

(71) Applicant: Karl F. Hirsch, Sammamish, WA (US)

(72) Inventor: Karl F. Hirsch, Sammamish, WA (US)

( * ) Notice: Subject to any disclaimer, the term of this patent is extended or adjusted under 35 U.S.C. 154(b) by 568 days.

(21) Appl. No.: 16/906,969

(22) Filed: Jun. 19, 2020

(65) Prior Publication Data

US 2020/0401125 A1 Dec. 24, 2020

Related U.S. Application Data

(60) Provisional application No. 62/864,215, filed on Jun. 20, 2019, provisional application No. 63/032,705, filed on May 31, 2020.

(51) Int. Cl.
*G05B 23/02* (2006.01)

(52) U.S. Cl.
CPC ..... *G05B 23/0283* (2013.01); *G05B 23/0272* (2013.01)

(58) Field of Classification Search
CPC ................ G05B 23/0272; G05B 23/0283
See application file for complete search history.

(56) References Cited

U.S. PATENT DOCUMENTS

| | | | |
|---|---|---|---|
| 6,751,048 B2 * | 6/2004 | Ostwald ............. | G11B 15/6815 360/92.1 |
| 7,559,282 B2 * | 7/2009 | Austin ................ | B65G 47/96 105/141 |
| 2003/0041770 A1 * | 3/2003 | Peck ................... | B23Q 7/1468 105/29.1 |
| 2005/0095087 A1 * | 5/2005 | Sullivan ............. | H01L 21/67736 414/217 |
| 2012/0125736 A1 | 5/2012 | Twigger et al. | |

(Continued)

FOREIGN PATENT DOCUMENTS

WO 2014152746 A1 9/2014

OTHER PUBLICATIONS

International Search Report and Written Opinion dated Oct. 19, 2020, which issued in the corresponding PCT Patent Application No. PCT/US 20/38850.

*Primary Examiner* — Ricky Go

(74) *Attorney, Agent, or Firm* — Dickinson Wright PLLC

(57) ABSTRACT

An industrial IoT system is provided that has adaptable, re-configurable, connected and integrated suite of smart, synchronized sensors and video/thermal cameras for continuous monitoring, access and control from anywhere in an industrial environment. A path sensor comprises a multi-sensor device with lookaround housing feature for monitoring conditions of conveyor brushes. A package sensor comprises a multi-sensor device with sensors adapted for mounting in different form factor carriers for monitoring conditions during package transport. A software platform integrates multiple layers of information from the sensors and video/thermal cameras and corresponding RFID locations into a single meaningful experience/assessment tool that can further be superimposed on a scaled representation of a monitored industrial environment generated from a map and dimensions for same.

9 Claims, 25 Drawing Sheets

(56) References Cited

U.S. PATENT DOCUMENTS

| | | | |
|---|---|---|---|
| 2012/0247362 A1* | 10/2012 | Rodgers | B61B 13/04 104/118 |
| 2013/0034911 A1 | 2/2013 | Wittkopp et al. | |
| 2014/0277699 A1 | 9/2014 | Moix et al. | |
| 2017/0066597 A1 | 3/2017 | Hiroi | |
| 2017/0207926 A1 | 7/2017 | Gil et al. | |
| 2018/0079605 A1 | 3/2018 | Koga et al. | |
| 2018/0284737 A1 | 10/2018 | Cella et al. | |

\* cited by examiner

FIG. 14B

MULTI-SENSOR SUITE AND INTERACTIVE SOFTWARE PLATFORM FOR REAL-TIME VISUALIZATION AND ANALYSIS OF DISTRIBUTED ENVIRONMENT CONDITIONS

This application is a non-provisional Patent Application, which is based on and claims the benefit of U.S. Provisional Patent Application Ser. No. 63/032,705, filed May 31, 2020 and U.S. Provisional Patent Application Ser. No. 62/864,215, filed Jun. 20, 2019, the entire contents of which are incorporated herein by reference.

BACKGROUND

Field

Illustrative embodiments relate generally to multi-sensor diagnostics for industrial systems for system commissioning and preventative maintenance.

Description of Related Art

E-retailers (e.g., Amazon) and shippers (e.g., USPS, FedEx and DHL) and companies that distribute their products (e.g., beverage companies) using autodistribution centers rely on significant infrastructure (e.g., expansive conveyor systems and sortation systems) to move products from a source (e.g., inventory location or conveyor introduction station) to a destination location (e.g., shipping sorting station designated for a selected geographical area) where products or packages are sorted by destination location for delivery via a transportation device (e.g., a vehicle, drone, and so on). Many of these companies are also having to manage an increasingly higher volume of much smaller orders for packages of goods to be shipped directly to consumer's doorsteps, in addition to retailers' shipments.

Increased throughput of packages by these companies for shipment results in increased maintenance and cost of down-time (e.g., malfunctioning or failure of conveyor or sorter equipment). These conveyor and sortation systems can comprise over 10-20 miles of conveyors installed within a distribution center having an area on the order of 4-5 football fields and include many different types of conveyors with vertical and horizontal sections as well as sections with curves and twists. Since conveyors can be installed at varying heights (e.g., on the order of 12 feet), they can be difficult to access and inspect by personnel. Thus, when conveyor or cross-belt sorter equipment failures occur, significant down-time occurs because visual inspection to locate a source of failure encompasses such an expansive space, some of which is not readily accessible to personnel due to equipment height, physical barriers presented by other surrounding equipment, and potentially hazardous moving parts.

In addition, break-downs of conveyor and sortation system equipment can result from many different equipment conditions (e.g., excessive vibration or undesired motion, or overheating), as well as facility environmental conditions (e.g., fire, unwanted humidity or water hazard, electrical hazard or power failure). Some of the equipment conditions cannot be detected through visual inspection and cannot be sensed prior to full mechanical breakdown. Thus, existing conveyor and sortation systems do not have a way to perform targeted diagnostics and preventive maintenance that minimizes down-time.

In addition to equipment break-downs, companies can lose significant revenue when goods that are conveyed and sorted for shipment are damaged by the process. Existing conveyor and sortation systems do not measure their impact on a payload or package. Further, maintenance engineers do not have means to determine where destructive payload impacts have occurred along their conveyor and sortation systems.

SUMMARY

The above and other problems are overcome, and additional advantages are realized, by illustrative embodiments.

The above described technical problems and others identified below are overcome by the technical solution of the present disclosure and example embodiments. The present disclosure and example embodiments provide diagnostics within a conveyor/sortation system that encompass the experience of the package and the path within that system. The technical solution provided by the present disclosure and example embodiments can be implemented in other types of monitored environments such as mining systems, fluid delivery systems, and so on.

It is an aspect of illustrative embodiments to provide a path sensor for detecting conditions of a designated moving portion of a conveyor, the conveyor portion being energized via brushes that contact a power rail, the path sensor comprising: a controller; and a sensor connected to the controller and configured to detect a condition of the brushes.

In accordance with aspects of illustrative embodiments, the sensor is a thermal sensor, and the path sensor further comprises a housing configured for mounting to the conveyor to move with the conveyor, the housing having a view portion thereof that extends over at least part of the brushes and has an aperture therein to provide a field of view for the thermal sensor that encompasses the at least part of the brushes.

In accordance with aspects of illustrative embodiments, the controller communicates the data received from the thermal sensor to an industrial monitoring device, and the thermal sensor data is used to generate a brush temperature grid comprising a detected temperature for each of a plurality of pixels in the brush temperature grid and a corresponding visual display that differentiates the pixels based on their respective detected temperatures.

In accordance with aspects of illustrative embodiments, the housing is removably connected to a conveyor bracket and comprises a slot therein that is dimensioned to receive an edge of the conveyor bracket and support the view portion extending beyond the edge.

In accordance with aspects of illustrative embodiments, the path sensor further comprises an ozone detector, and the view portion of the housing comprises a second aperture to expose the ozone detector to the brushes when the housing is mounted to the conveyor.

It is an aspect of illustrative embodiments to provide an industrial monitoring system for monitoring an industrial environment comprising: a plurality of multi-sensor devices (MSDs) comprising plural sensors to detect different conditions with respect to their respective positions of deployment in the industrial environment and generate corresponding sensor data, the sensor data chosen from detected distance to nearest object, vibration in one or more of three dimensional axes, orientation data in one or more of three dimensional axes, thermal camera data, video camera data, sound data, voltage measurement data corresponding to a device use in the industrial environment, temperature data, moisture data, battery level data corresponding to a battery used in the MSD, ozone data, and MSD location data; and an industrial monitoring device (IMD) having a controller, a memory device, a communication interface and a display, the communication interface connecting the IMD to each of the MSDs via their respective communication interfaces for communication using any of wireless communication and wired communication, The MSDs transmit their sensor data to the IMD, the controller synchronizes their sensor data and generates an integrated view on a display screen comprising real-time data chosen from their sensor data. For each MSD using that MSD's sensor data, the IMD performs hypertext markup language (HTML) embedded synchronization, and generates integrated HTML video and data output for selective viewing and analysis by a user via the display.

In accordance with aspects of illustrative embodiments, the IMD generates a threshold alert summary for the display using the HTML video and data output for each of a plurality of the MSDs, the threshold alert summary comprising a row of icons for each of the MSDs, the icons representing respective ones of their plural sensors. In response to a user setting thresholds for at least some of sensor data collected at each MSD, the IMD determines when the thresholds are exceeded by received sensor data from the MSDs, and changes a characteristic of the corresponding icon for the sensor with sensor data that exceeds a threshold, the change in characteristic being chosen from a change in color, flashing the icon, changing intensity of icon, changing the correspond icon to a different icon.

In accordance with aspects of illustrative embodiments, the controller generates continuous, real-time, animated rendering of status of one or more MSDs and their data via HTML video and data output.

In accordance with aspects of illustrative embodiments, the IMD generates an expanded view of sensor data for the designated MDS having sensor data that exceeds its thresholds using the HTML video and data output.

In accordance with aspects of illustrative embodiments, the IMD generates the expanded view in response to a user selecting one of the rows.

In accordance with aspects of illustrative embodiments, for at least some of sensor data collected at each MSD are system configurable, and the IMD determines when the thresholds are exceeded by received sensor data from the MSDs in the HTML video and data output and generates an alert via its display.

In accordance with aspects of illustrative embodiments, the IMD analyzes the HTML video and data output over time to identify events wherein MSDs' thresholds were exceeded and patterns of data corresponding to failure modes to determine data signatures used for predictive maintenance of the equipment in the industrial environment being monitored via the MSDs.

In accordance with aspects of illustrative embodiments, the IMD plays back an output chosen from a real-time detected sound, a real-time video image, and a real-time thermal image corresponding to a selected MSD using the HTML video and data output and in response to user activation of a corresponding button provided with respect to the MSD sensor data, the button being configured by the IMD to allow a user to select a point in time in the output and view or listen to the corresponding sensor data in the HTML video and data output.

In accordance with aspects of illustrative embodiments, the IMD generates an MSD collected data view for the display, the MSD collected data view comprising a row for each of the MSDs, each row comprising an MSD identifier and real-time sensor data for each of a plurality of the different conditions detected by the sensors and provided via the HTML video and data output, the real-time sensor data chosen from alphanumeric values, a thumbnail view of thermal camera data, a real-time signal trace, an average of sensor data values, and a plurality of data points from the sensor data over a selected range of time relative to a designated time chosen from a user selected time and current system time.

In accordance with aspects of illustrative embodiments, the IMD generates an expanded view of thermal camera data corresponding to the thumbnail view of thermal camera data in response to user selection of the thumbnail view.

In accordance with aspects of illustrative embodiments, the IMD plays back an output chosen from a real-time detected sound, a real-time video image, and a real-time thermal image in response to user activation of a corresponding button provided with respect to the MSD collected data view.

In accordance with aspects of illustrative embodiments, the IMD generates a layered screen view for the display comprising sensor data corresponding to a designated MSD, the layered screen view comprising plural captured images from different fields of view relative to an item moving in the industrial environment and captured by one or more cameras chosen from a video camera and thermal camera, and overlaid alphanumeric data chosen from detected distance to nearest object, vibration in one or more of three dimensional axes, orientation data in one or more of three dimensional axes, thermal camera data, video camera data, sound data, voltage measurement data corresponding to a device use in the industrial environment, temperature data, moisture data, battery level data corresponding to a battery used in the MSD, ozone data, and MSD location data.

In accordance with aspects of illustrative embodiments, the industrial environment comprises a conveyor and sortation system, and the IMD imports conveyor layout and dimension data and generates a scaled graphical image of the conveyor and sortation system that comprises overlapping sensor data of the MSDs.

In accordance with aspects of illustrative embodiments, at least some of the MSDs are connected to the conveyor and moving when the conveyor is moving, the IMD determining locations of the moving MSDs and displaying icons representing the moving MSDs on the a scaled graphical image of the conveyor and sortation system.

In accordance with aspects of illustrative embodiments, the IMD uses sensor data of the MSDs and conveyor velocity to determine location of the moving MSDs.

In accordance with aspects of illustrative embodiments, the moving MSDs each have an associated RFID tag with unique identifier that is detected by an RFID reader deployed relative to the conveyor to determine distances between MSDs for their location determination using conveyor speed.

In accordance with aspects of illustrative embodiments, at least one of the MSDs is a path sensor that detects conditions of a designated moving portion of the conveyor, the conveyor portion being energized via brushes that contact a power rail. The path sensor comprises: a controller; and a sensor connected to the controller and configured to detect a condition of the brushes.

In accordance with aspects of illustrative embodiments, the sensor is a thermal sensor, and the path sensor further comprises a housing configured for mounting to the conveyor to move with the conveyor, the housing having a view portion thereof that extends over at least part of the brushes and has an aperture therein to provide a field of view for the thermal sensor that encompasses the at least part of the brushes.

In accordance with aspects of illustrative embodiments, the path sensor transmits data from the thermal sensor to the IMD, and the IMD uses the thermal sensor data to generate a brush temperature grid comprising a detected temperature for each of a plurality of pixels in the brush temperature grid, and a corresponding pixelated visual presentation on the display that differentiates the pixels based on their respective detected temperatures.

In accordance with aspects of illustrative embodiments, thresholds for temperatures of the brushes are system configurable, and the IMD generates an alert detected temperatures indicated in the pixels that correspond to the brushes exceeds their thresholds.

In accordance with aspects of illustrative embodiments, at least one of the MSDs is a package sensor that detects conditions experienced by a package transported within the conveyor and sortation system, the plural sensors deployed in the package sensor to detect different conditions being chosen detected distance to nearest object, vibration in one or more of three dimensional axes, orientation data in one or more of three dimensional axes, thermal camera data, video camera data, and sound data, the plural sensors being reconfigurable for mounting in packages having different form factors and chosen from tote, tray, box, crate, carrier and cart.

Additional and/or other aspects and advantages of illustrative embodiments will be set forth in the description that follows, or will be apparent from the description, or may be learned by practice of the illustrative embodiments. The illustrative embodiments may comprise apparatuses and methods for operating same having one or more of the above aspects, and/or one or more of the features and combinations thereof. The illustrative embodiments may comprise one or more of the features and/or combinations of the above aspects as recited, for example, in the attached claims

BRIEF DESCRIPTION OF THE DRAWINGS

The above and/or other aspects and advantages of the illustrative embodiments will be more readily appreciated from the following detailed description, taken in conjunction with the accompanying drawings, of which:

Reference will now be made in detail to illustrative embodiments, which are depicted in the accompanying drawings. The embodiments described herein exemplify, but do not limit, the illustrative embodiments by referring to the drawings.

FIGS. 14A and 14B are example GUI screen portions generated by a software platform to graphically represent path sensor measurement data or threshold settings in accordance with an example embodiment;

Throughout the drawing figures, like reference numbers will be understood to refer to like elements, features and structures.

DETAILED DESCRIPTION OF ILLUSTRATIVE EMBODIMENTS

Figure 1:
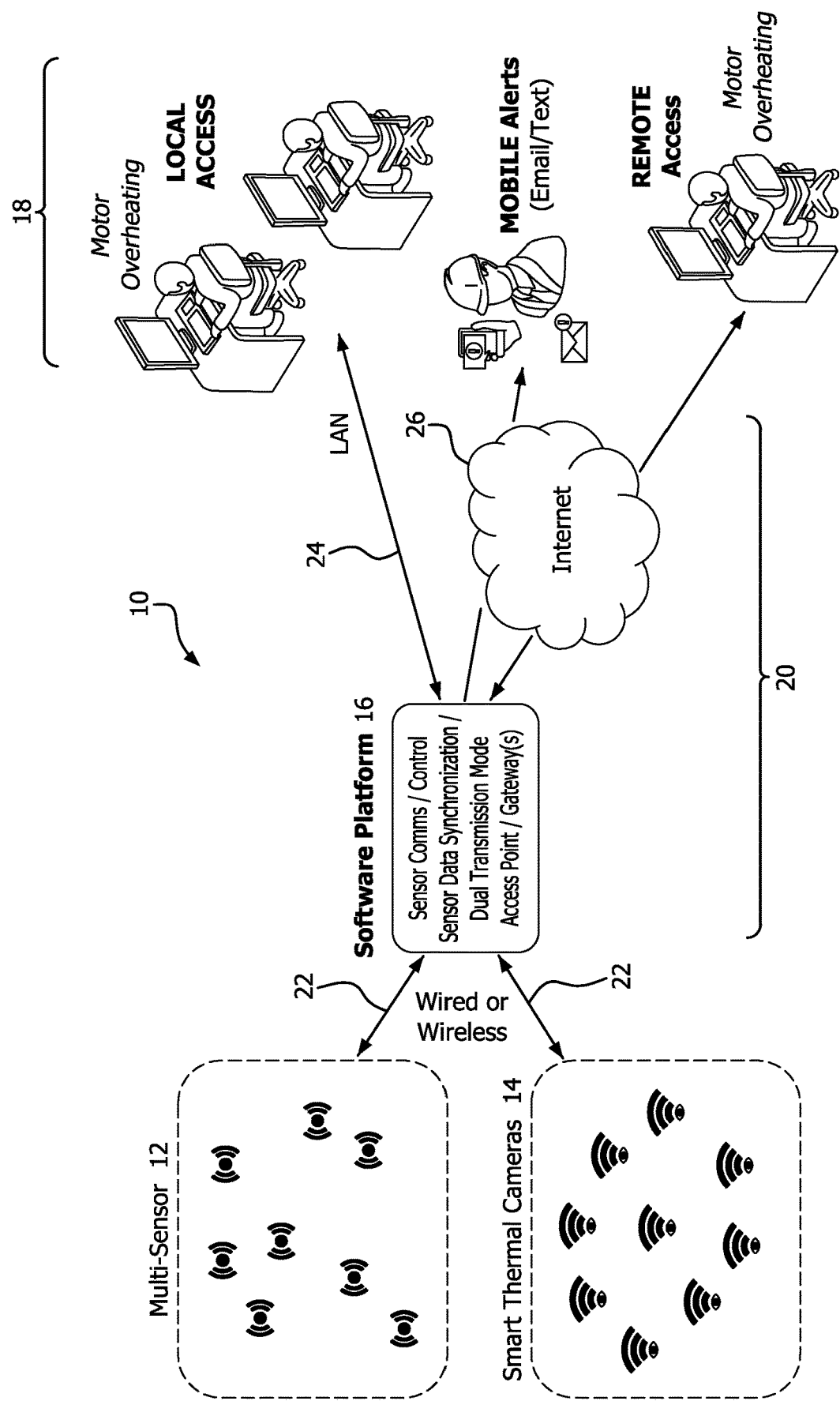
FIG. 1 depicts multi-sensor devices and a software platform in an industrial Internet of things (IoT) system in accordance with an example embodiment.

Reference will now be made in detail to illustrative embodiments, which are depicted in the accompanying drawings. The embodiments described herein exemplify, but do not limit, the illustrative embodiments by referring to the drawings.

Described herein are two example embodiments of a sensor and IoT software platform system 10.

In accordance with a first example embodiment (e.g., FIGS. 1 and 12B), the sensor and IoT software platform system 10 is implemented as an attached multi-sensor system 10 comprising plural multi-sensor devices (MSDs) 12 (e.g., path sensors 50) and cameras 14 (e.g., thermal and/or video cameras 22) that are implemented as part of the conveyor 28 or other monitored industrial asset to provide maintenance personnel at a console(s) 18 a continuous, live stream, location-based, first person view of a moving asset for diagnostic purposes from the viewpoint of the path experience. MSDs 12 are connected to and move with the conveyor and they, along with stationary cameras 14 deployed along the monitored moving asset 28, become part of the conveyor for diagnostic purposes.

In accordance with a second example embodiment (e.g., FIGS. 12A and 17), the sensor and IoT software platform system 10 is implemented as a mobile multi-sensor system 10 having a multi-sensor device (MSD) 12 integrated into a package sensor 250 described below that is mobile in the sense that it is detached from, yet moves with, a conveyor 28 or other moving industrial asset that is being monitored by the system 10. The package sensor 250 is a self-contained, stand-alone system with one or more video cameras, thermal camera and several sensors that can be periodically placed on the conveyor 28 to provide maintenance personnel at a console 18 a first person view of a moving asset for diagnostics of the conveyor from the viewpoint of a package/parcel experience thereon. The package sensor 250 rides the conveyor and records data and video, analyzes it for threshold events, and integrates all into synchronized an output (e.g., a single HTML or MP4 file) that is available for viewing and analysis after the recording session.

Figure 12A:
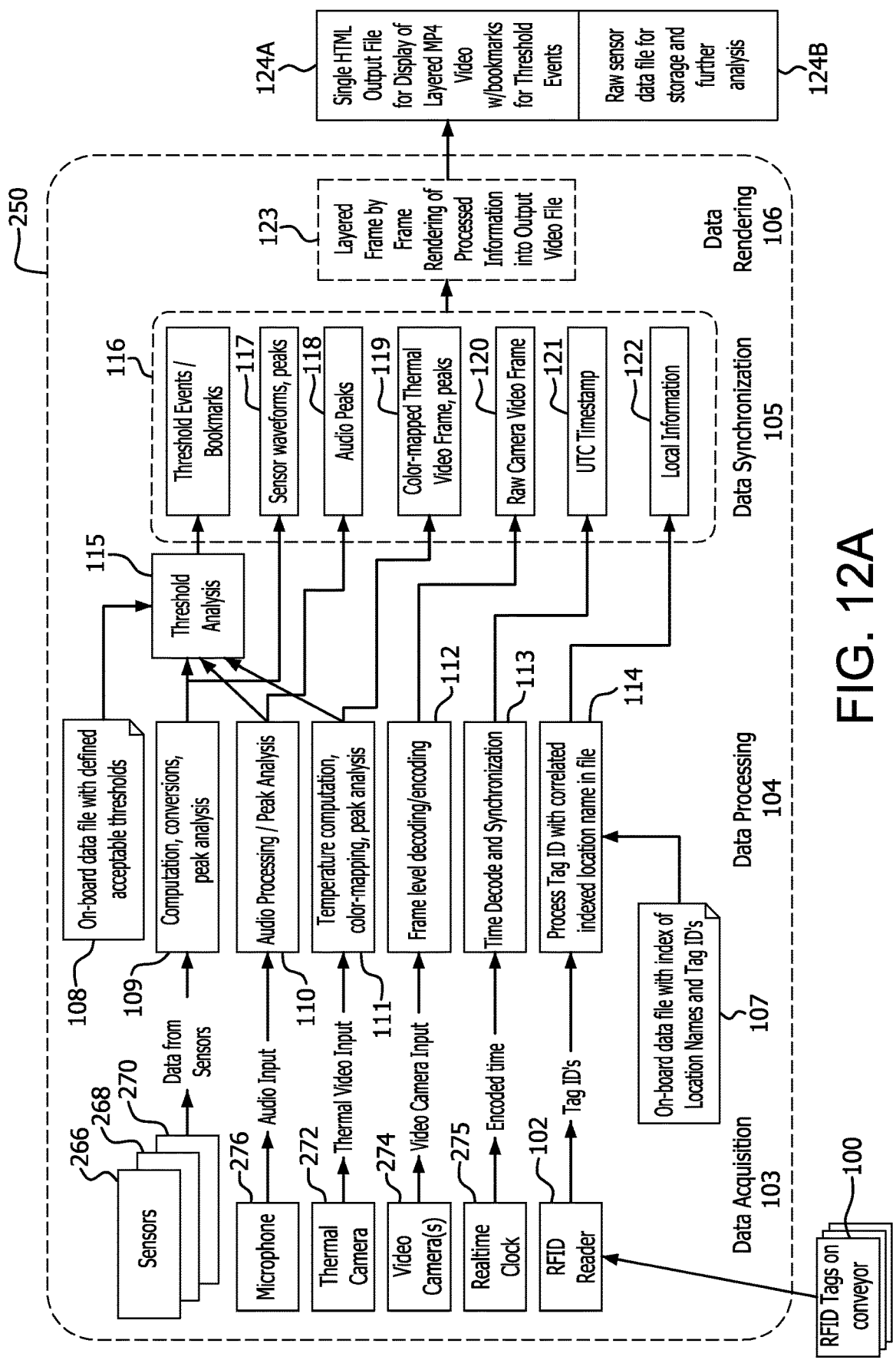
FIGS. 12A and 12B depict operations of a software platform to receive, process and display real-time information related to path sensors provided to a conveyor in accordance with a respective example embodiments.
Figure 12B:
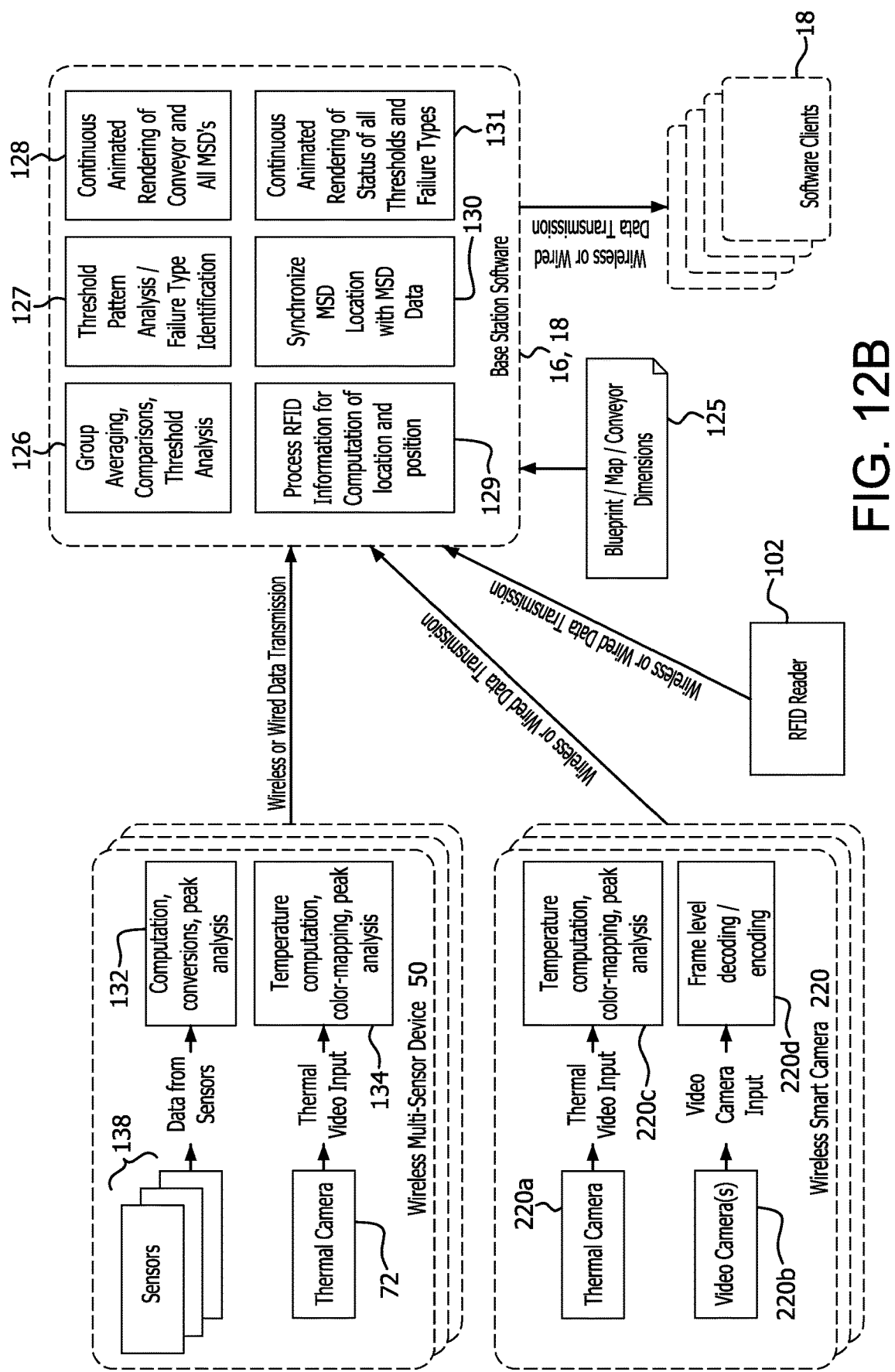

FIG. 1 depicts multi-sensor devices (MSDs) 12 and a software platform 16 in an industrial Internet of things (IoT) system 10 in accordance with the first example embodiment (FIG. 12B). The MSDs 12 and software platform perform real-time, continuous, location-based multi-sensor diagnostics for a connected, holistic, first person diagnostic view of a conveyor system or other industrial asset being monitored.

MSDs 12 are provided as path sensors 50 attached to the conveyor 28 (FIG. 2) and smart cameras indicated at 14 in FIG. 1 (e.g., a thermal and/or video camera 220 in FIG. 15) mounted adjacent the conveyor 28 to provide conveyor maintenance personnel with a first person view from the conveyor or path thereof, that is, allowing personnel to experience a conveyor's experience as it moves along its path. Such MSDs 50 and 220 are advantageous for live continuous analysis of critical physical characteristics of the conveyor 28 and its surrounding areas, for identification of conveyor 28 components departing from normal data ranges, for learning and identifying patterns of health, failure and pre-failure modes of the conveyor 28 components, and predicting and preventing maintenance issues.

As shown in FIGS. 1 and 12B, the MSDs 12 and cameras 14 are connected to a software platform 16 for providing real-time sensor data to user devices 18 (e.g., mobile phones, laptops, iPads, personal computers operating as industrial monitoring devices (IMDs)) connected via a network 20 comprising, for example, wired/wireless connections 22 between sensors 12/cameras 14 and the platform 16 for operating the IMDs. The IMDs 18 have a processor and associated memory and a network interface. The software platform 16 can be server-based with a base station IMD 18 cooperating with other IMDs 18 implementing a client application. Other processing architectures can be used. The network 20 can comprise a local area network (LAN) 24 to connect local users (e.g., maintenance personnel) to the software platform 16 to analyze sensor data and internet cloud and/or cellular network 26 to connect remote users 18 to the software platform 16.

Figure 2:
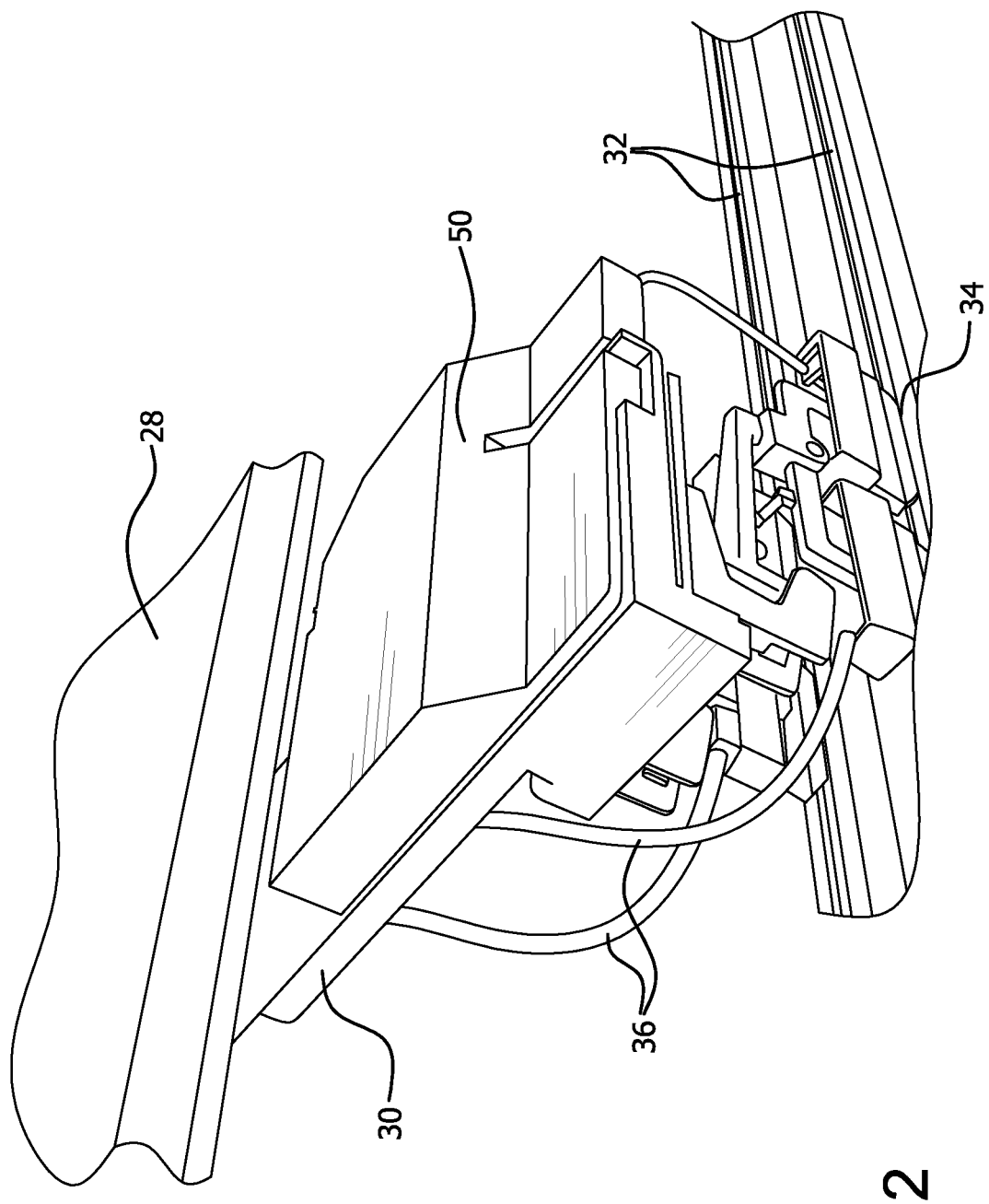
FIG. 2 depicts a multi-sensor sensor device operable as a path sensor constructed in accordance with an example embodiment and mounted on a conveyor bracket that connects to power rails of a conveyor via brushes.
Figure 3:
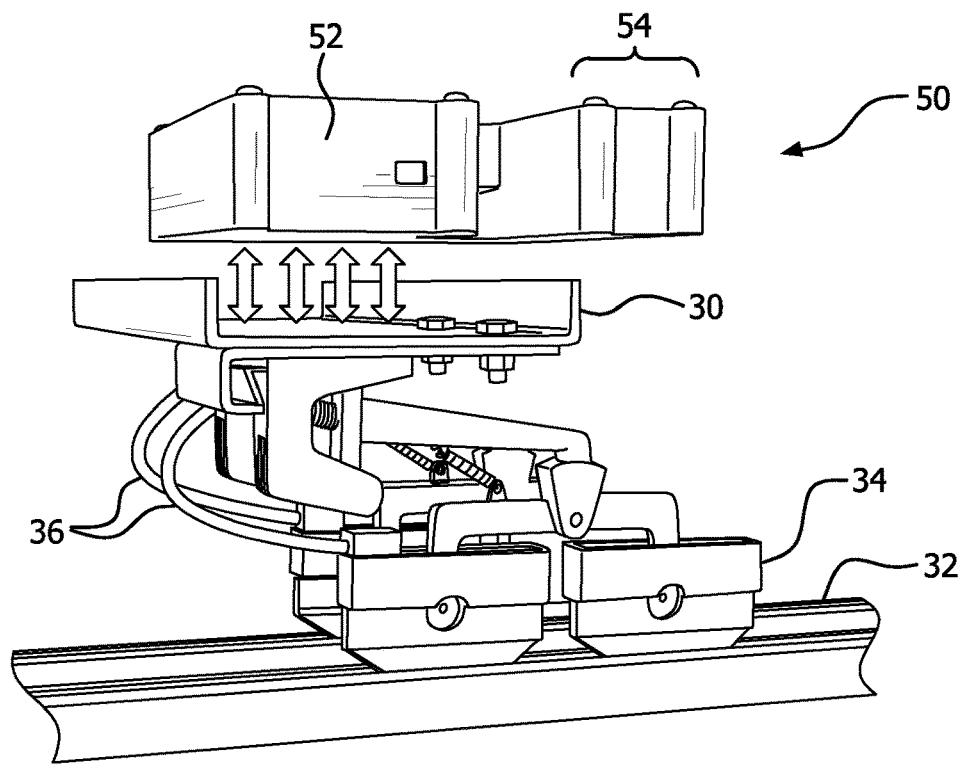
FIG. 3 is a side view of the path sensor in FIG. 2 prior to mounting on the conveyor bracket.
Figure 4:
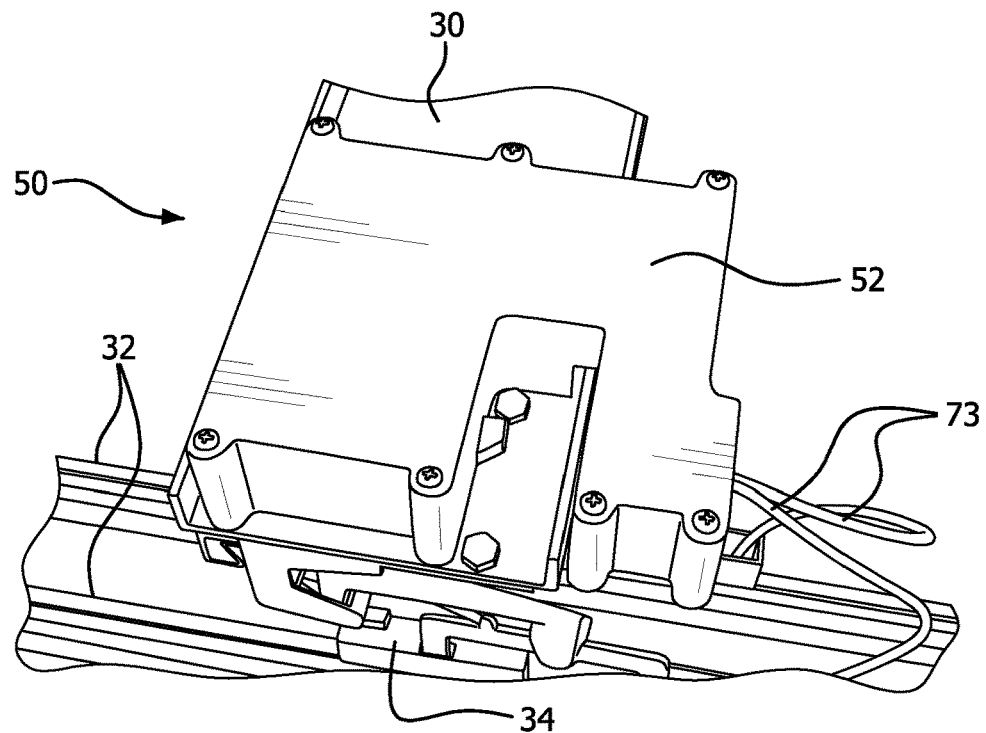
FIG. 4 is a top view of the path sensor in FIG. 2.
Figure 5:
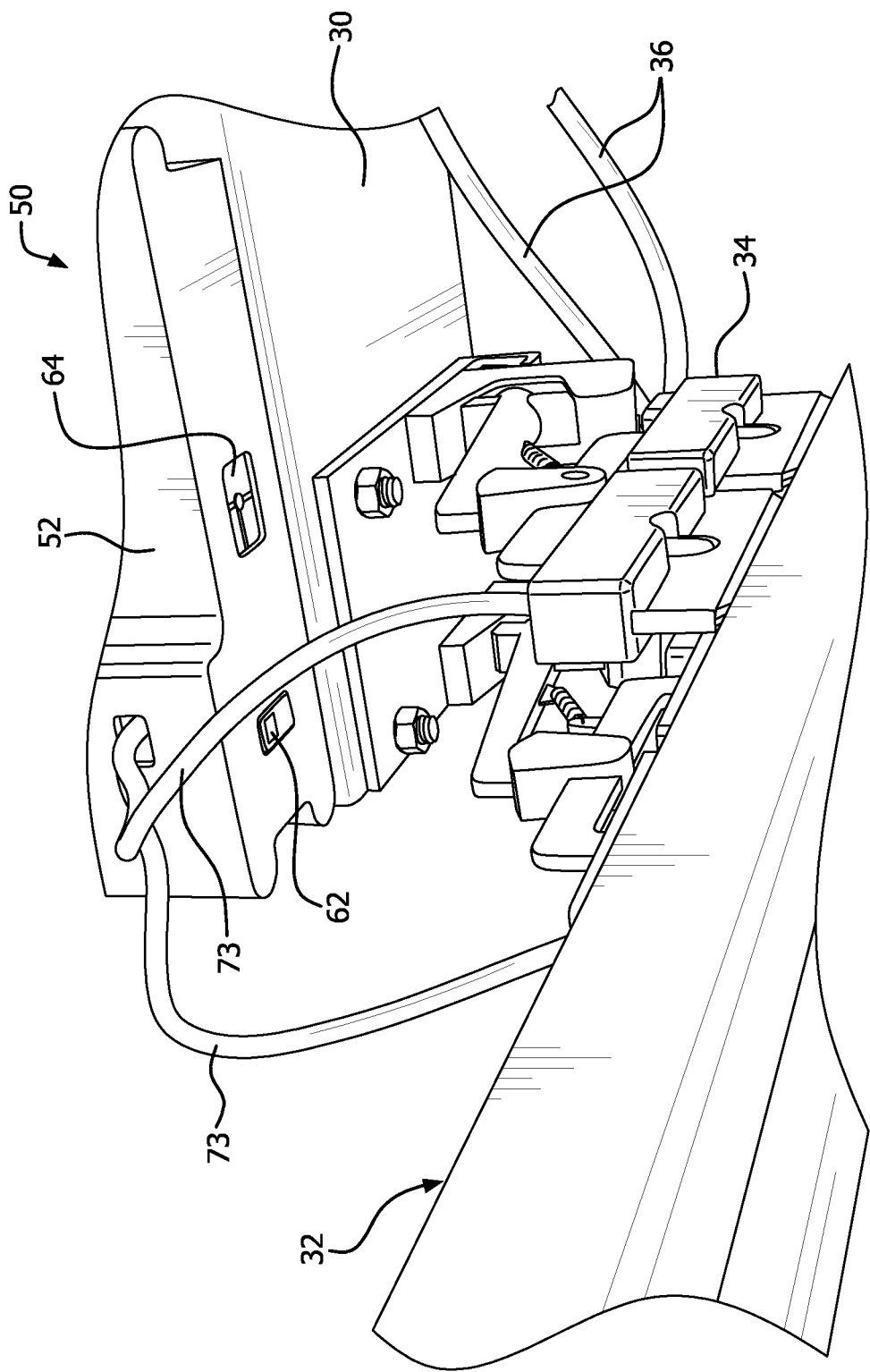
FIG. 5 is a partial bottom view of the path sensor in FIG. 2.
Figure 6:
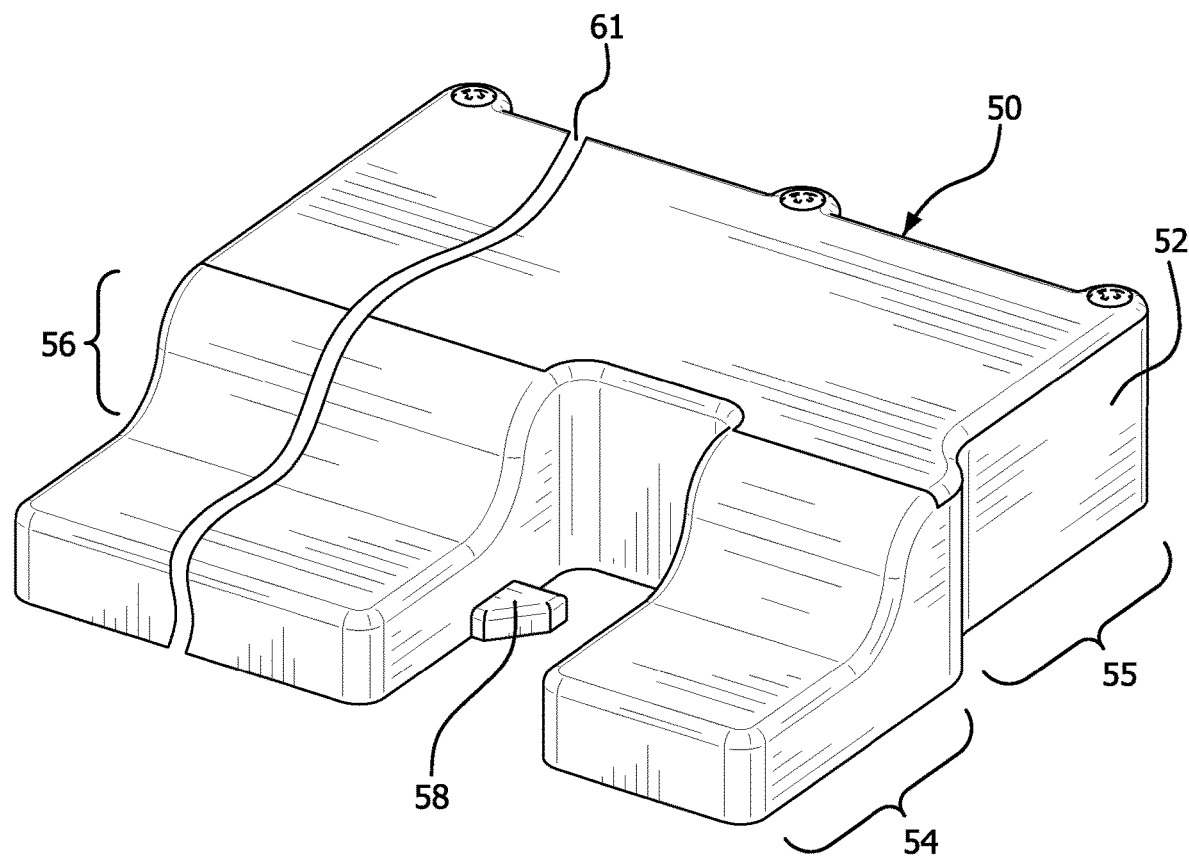
FIG. 6 is a top perspective view of a path sensor housing constructed in accordance with an example embodiment.
Figure 7:
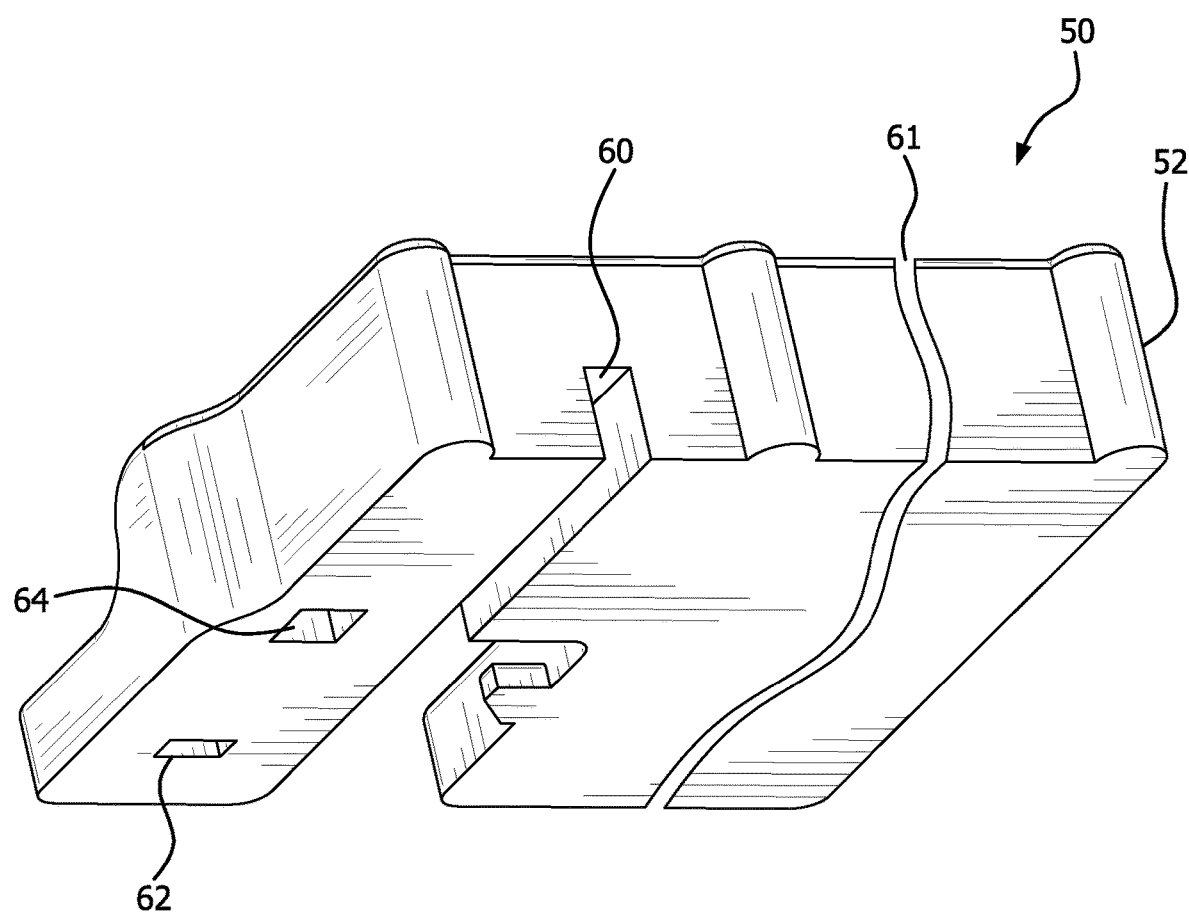
FIG. 7 is a bottom perspective view of the path sensor in FIG. 6.
Figure 8:
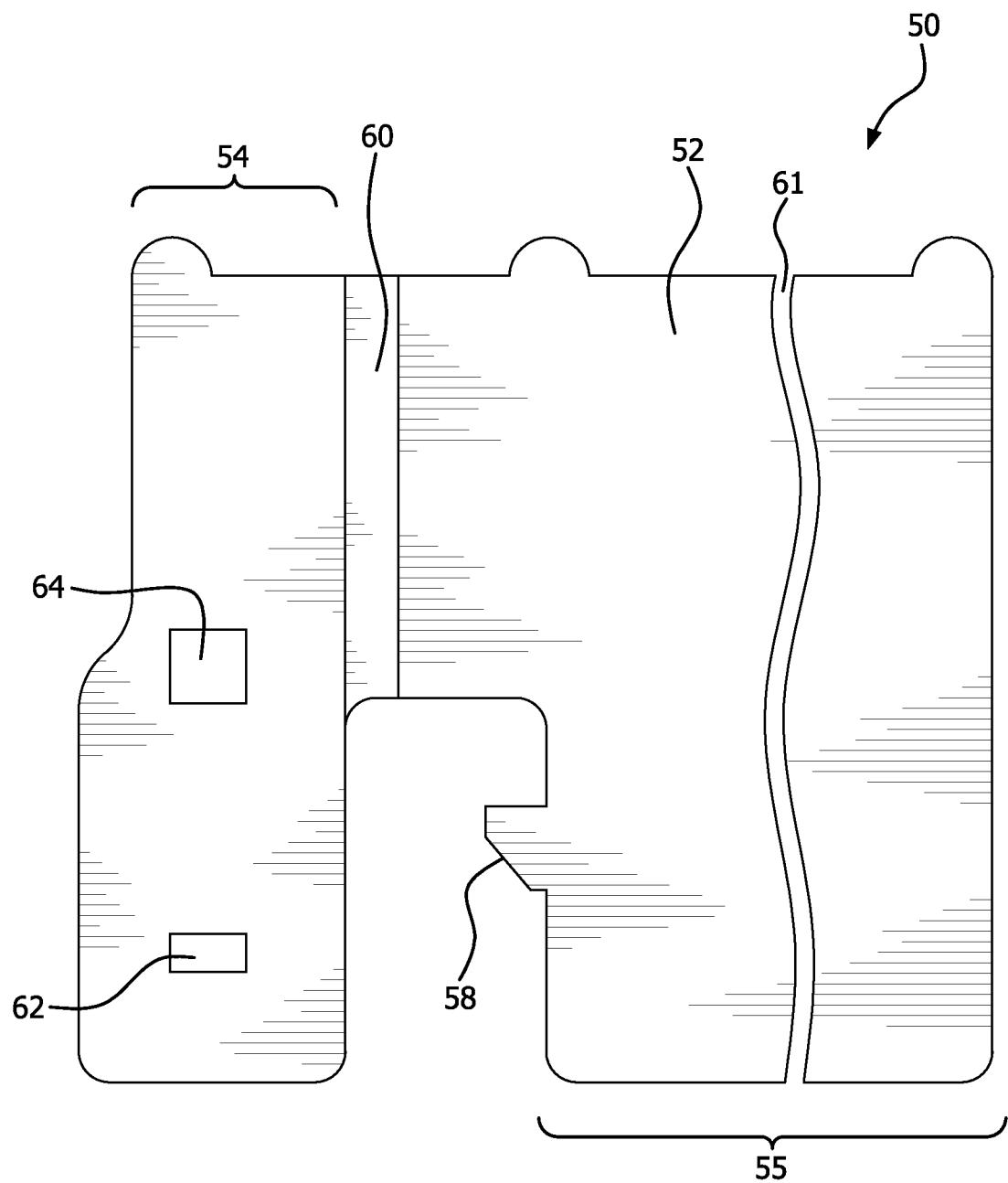
FIG. 8 is a bottom plan view of the path sensor in FIG. 6.

FIG. 2 depicts a multi-sensor device 12 operable as a path sensor 50 constructed in accordance with an example embodiment to move with a conveyor 28 and allow maintenance personnel to receive first person experience of the path. The path sensor 50 is mounted on a conveyor bracket 30 that connects to power rails 32 of a conveyor 28 via brushes. For example, the conveyor 28 can have plural carriers, and spaced among the carriers are brackets 30 with brush heads 34 with brush conductors for contacting the power rails 32. Brush head wires 36 conduct current received from the rails to conveyor components such as a cross-belt sorter (e.g., a CB4000 cross-belt sorter commercially available from Honeywell Intelligrated). FIG. 3 is a side view of the path sensor 50 in FIG. 2 prior to mounting on the conveyor bracket 30. FIG. 4 is a top view of the path sensor 50. FIG. 5 is a partial bottom view of the path sensor 50 deployed on a bracket 30. FIG. 6 is a top perspective view of a path sensor housing 52 constructed in accordance with an example embodiment. FIG. 7 is a bottom perspective view of the path sensor housing 52. FIG. 8 is a bottom plan view of the path sensor housing 52.

With continued reference to FIGS. 2 through 8, the path sensor housing 52 is configured to mount on the bracket 30 for fast and secure installation by snapping into place using a strong embedded magnetic base such as a strong neodymium magnetic base. Secured placement of the housing 52 is further ensured by a custom fit on back of a bracket 30. As described below, the housing 52 has a housing lookaround portion 54 that extends beyond the bracket 18 to provide an innovative look-behind or lookaround field of view for thermal and ozone monitoring of the brushes 34. The remaining portion 55 of the housing 52 can be resized and reshaped as needed to fit within the edges of a bracket 30, for example. As indicated at 61 in FIGS. 6, 7 and 8, the housing 52 dimensions can vary in width and/or length depending on dimensions of the bracket 30 or other component to which the housing 52 is mounted. In addition, the housing 52 has an optional sloped portion 56 that is shaped to avoid a wire hut obstruction on surrounding equipment as the path sensor passes by during conveyor movement. The housing 50 has a lock notch 58 that helps stabilize the path sensor 50 against the bracket 30. The housing also has a slot 60 dimensioned to receive an edge of the bracket 30.

With continued reference to FIGS. 2 through 8, the housing portion 54 is provided with an aperture 62 for a thermal field of view (FOV) sensor 70 deployed therein, and an aperture 64 for an ozone sensor 78 deployed therein. The apertures 62 and 64 are disposed along the housing lookaround portion 54 that extends beyond the bracket 18 in a manner to allow sufficient views of the brush heads 34 to implement the innovative look-behind or lookaround field of view thermal and ozone monitoring in accordance with example embodiments.

Figure 9:
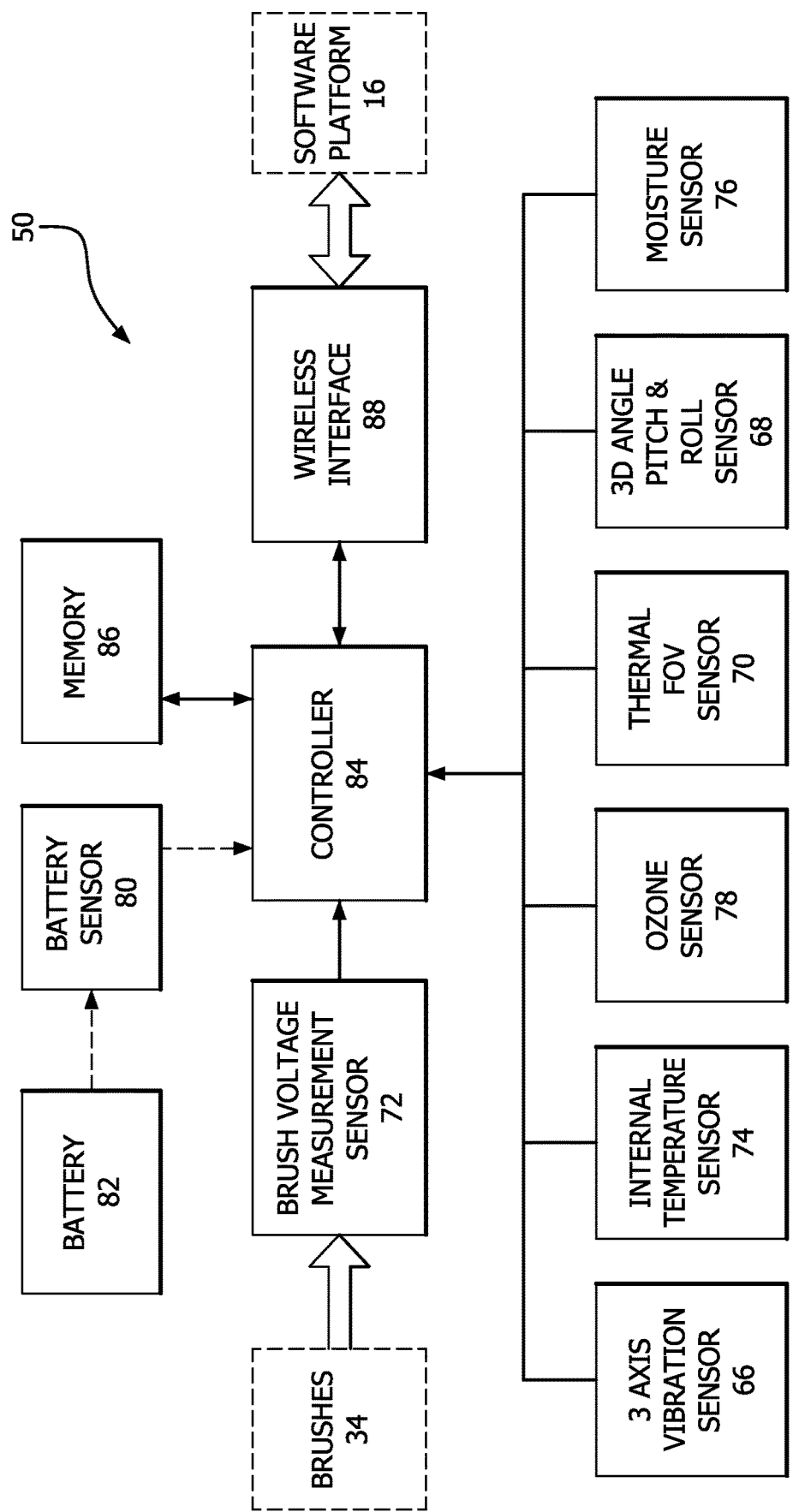
FIG. 9 is a block diagram of a path sensor constructed in accordance with an example embodiment.

FIG. 9 is a block diagram of a path sensor 50 showing example components disposed within the housing 52 to detect various conditions of the bracket 30 and brush heads 34 or other moving conveyor component to which the path sensor 50 is connected. For example, the path sensor 50 is provided with a three-axis vibration sensor 66, a three-dimension angle sensor 68 used for pitch and roll sensing to facilitate alignment or orientation inspection, and the aforementioned thermal FOV sensor 70 for detecting brush temperatures and providing live thermal video analysis as described below. The path sensor 50 also has a brush conductor voltage measurement sensor 72 connected to wires 73 from brush heads. The path sensor 50 is also provided with a temperature sensor 74, a moisture sensor 76, an ozone sensor 78, and a battery level sensor 80 for detecting the voltage level of the battery or continuous power source 82 provided to the path sensor 50.

As described below, the path sensor 50 is configured to transmit data from its sensors to an industrial management device (IMD) (e.g., base station or console) 18 running the software platform 16 to provide real-time data on sensed conditions in the system 10. As shown in FIG. 9, the path sensor 50 is provided with a controller 84, memory 86, and a communication interface 88. For example, the communication interface 88 to the software platform 16 can be a wireless interface such as a long range wireless (LoRa) or WiFi interface.

Figure 10A:
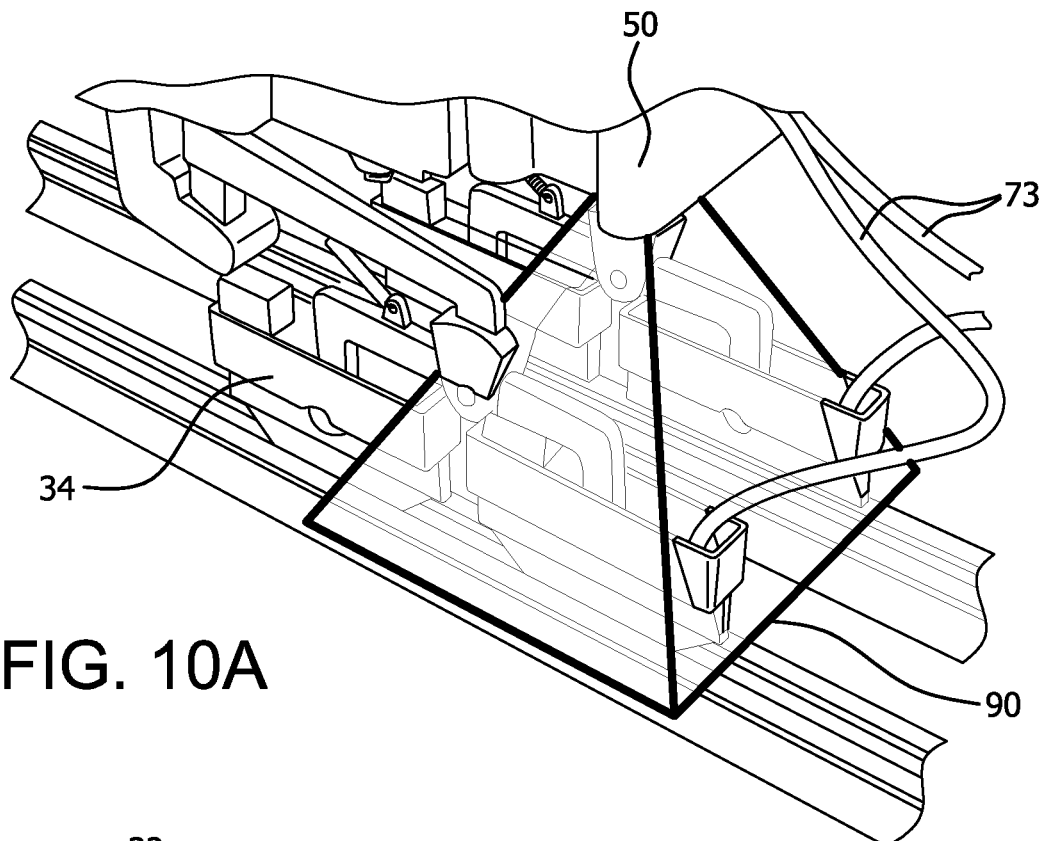
FIG. 10A is a partial view of the path sensor in FIG. 2 depicting a view frustum of a thermal field of view sensor provided in the path sensor in accordance with an example embodiment.
Figure 10B:
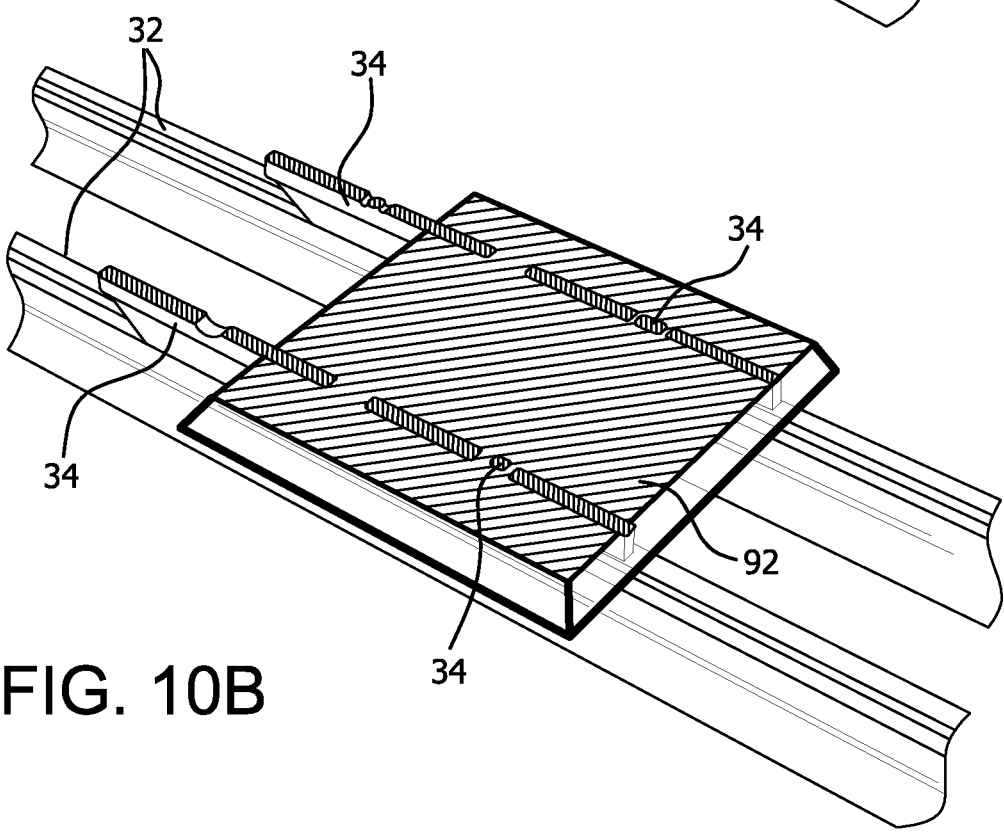
FIG. 10B is a cross-section of the view frustum of FIG. 10A at least partially overlapping the conductor brush heads.
Figure 10C:
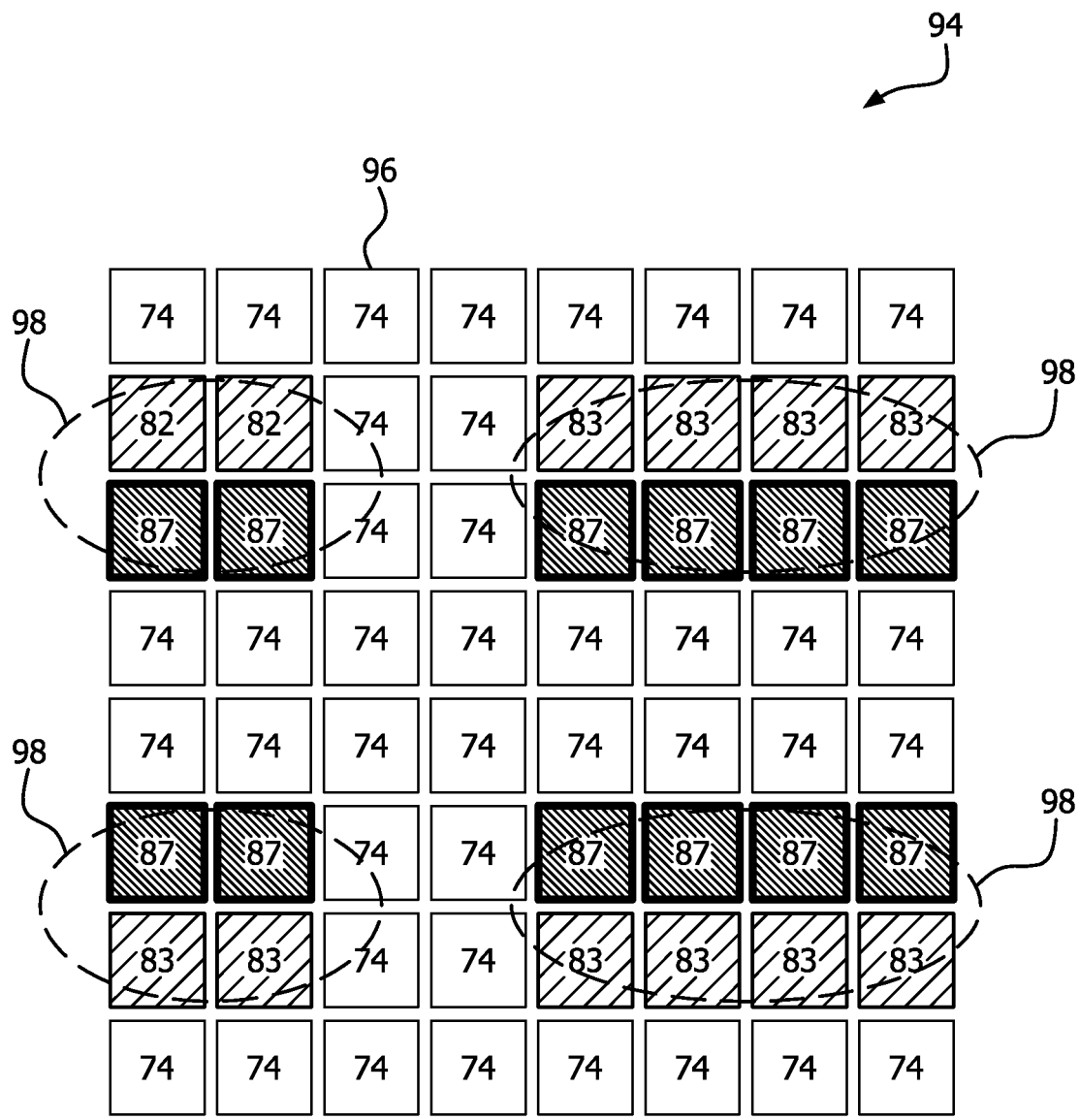
FIG. 10C is a partial brush temperature grid generated by a path sensor in accordance with an example embodiment.

FIG. 10A is a partial view of the path sensor 50 depicting a view frustum 90 of the thermal FOV sensor 70. FIG. 10B depicts a cross-section 92 of the view frustum 90 that at least partially overlaps with the conductor brush heads 34. As shown in FIG. 10C, a partial brush temperature grid 94 is shown. A brush temperature grid 94 is generated by the path sensor 50 in accordance with an example embodiment with cells 96 that correspond to an area within the frustrum 90 of the thermal FOV sensor 70. Example detected temperatures are indicted in cells 96 in degrees Fahrenheit. Cells corresponding to the sensed areas that overlap with the brushes on the brush heads 34 are indicated at 98. As described below, the software platform 16 receives the sensed data from MSDs 12 such as path sensors and generates integration continuous live video and overlapping sensor data from MSDs 12 and location data that allows the monitored conveyor 28's conditions be visualized and presented to the IMDs 18 in a manner that facilitates targeted view of components exceeding thresholds and immediate location of same. For example, the brush temperature grid 94 from a MSD 12 and the platform 16 provides the user 18 a convenient way of visually inspecting the conditions of brush heads 34 from a remote location by generating a thumbnail image 206 and related expanded data view shown in FIG. 14A and optional expanded image view (not shown) when the thumbnail 206 or other GUI button on an IMD 18 screen is selected.

Figure 11A:
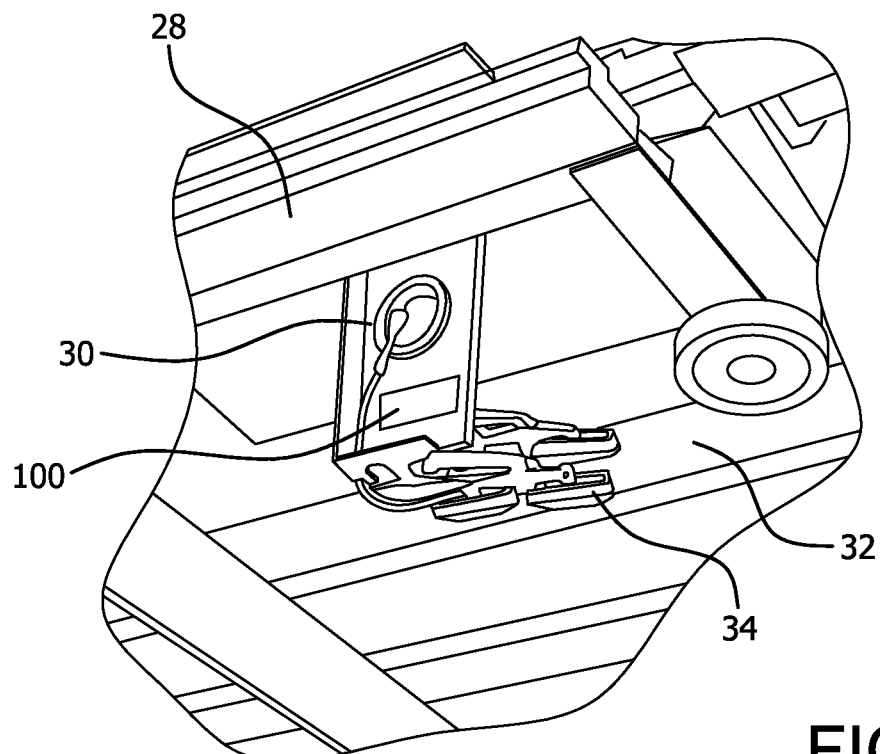
FIG. 11A is a rear view of the path sensor of FIG. 2 identified by an RFID tag in accordance with an example embodiment.
Figure 11B:
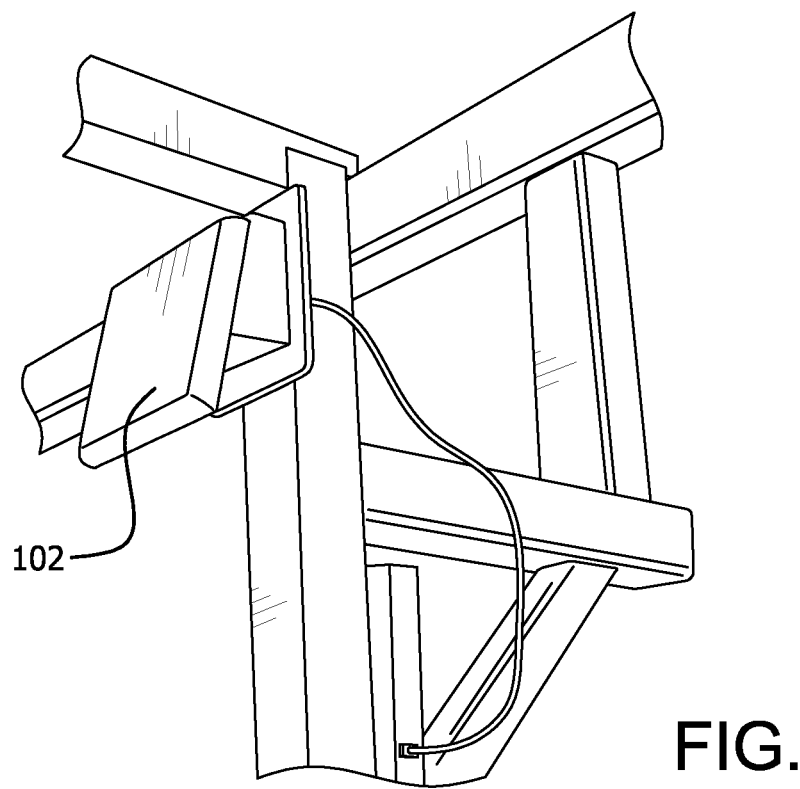
FIG. 11B depicts an RFID reader located proximally to the conveyor on which the path sensor of FIG. 2 travels in accordance with an example embodiment.

FIG. 11A is a rear view of the path sensor 50 mounted on a bracket 30 identified by an RFID tag 100 in accordance with an example embodiment. FIG. 11B depicts an integrated RFID reader and RFID antenna device 102 located proximally to the conveyor 28 on which the path sensor 50 travels in accordance with an example embodiment. For example, the RFID reader and antenna 102 is placed at a location proximal to the conveyor 28 and connected to the system 10 network (e.g., FIG. 20). RFID tags 100 are provided on the bracket 30 or other moving conveyor component on which the path sensor 50 is mounted. Further, the RFID tags 100 can be provided to other parts of the conveyor 28 (e.g., on the carriers or carts thereof), and to a MDC 12 configured as a package sensor 250 described below in connection with FIGS. 17, 18, 19A and 19B. The RFID reader and antenna device 102 receives signals from RFID tags 100 as their corresponding bracket 30 and other RFID tagged conveyor component, or package sensor 250 passes on a moving conveyor 28. Tag 100 data is sent by the reader 102 in TCP/IP packets via Ethernet to the software platform 16 via a router or switch 316. The software platform 16 operates as a location tracking system that synchronizes the incoming sensor data from the MSDs 12 with precise location and time. The MSD 12 locations are determined using conveyor speed, and the RFID tag 100 information to determine relative distances of tagged devices. This synchronization helps delineate between failures of the moving parts versus failures of fixed structural elements of the conveyor 28. The location tracking system also provides for a stand-alone benefit of providing engineers visual awareness (e.g., path event 156 in FIG. 13) of immediate location of all moving components of the conveyor 28 for fast access and service with significant reduction in downtime. It is beneficial for the platform 16 to store the carrier numbers associated with respective path sensors 50. Thus, when a carrier or related component is indicating a malfunction, the corresponding carrier can be quickly located using the location-based information received via the tagged path sensors 50 on the cross-belt sorters.

FIG. 12B is a diagram of operations of the software platform 16 to receive, process and display real-time information related to path sensors provided to a conveyor 28 or other monitored environment via IMD(s) 18 in accordance with an example embodiment. MSDs 12 such as a path sensor 50 perform computations, conversions and peak analysis 132 on data from their sensors 138 (e.g., sensors described in connection with FIG. 9), and temperature computation, color-mapping and peak analysis 134 on thermal video input from the thermal camera 72. Smart cameras 14 (e.g., thermal and/or video cameras 220) perform computations, conversions and peak analysis 220c on data from its thermal camera 220a, and frame level decoding/encoding 220d of the thermal video input from the thermal camera 220b. A base station IMD 18 operating in accordance with the software platform 16 receives outputs from the MSDs 12 (e.g., a path sensor 50) and cameras 14 (e.g., a thermal and/or video camera 14) and the RDIF reader 102. The base station IMD 18 operating in accordance with the software platform 16 can also be provided with conveyor blueprints, maps, dimensions and other information 125. The base station IMD 18 integrates conveyor dimensions to produce a map (e.g., similar to a navigation system in a car) that then precisely places a sensor and the data it produces at that time at the respective location. The base station IMD 18 uses the received information to perform operations such as: Group Averaging, Comparisons, Threshold Analysis 126, Threshold Pattern Analysis and Failure Type Identification 127, RFID information processing for computation of location and position 129, Synchronization of MSD Location with MSD Data 130, Continuous Animated Rendering of Conveyor and MSDs 12 128, and Continuous Animated Rendering of Status of all Thresholds and Failure Types 131, using HTML live stream feed with integration sensor and location data that can be selectively displayed as continuously generated video with layered, synchronized graphics and alphanumeric information from the sensors and cameras.

Figure 13:
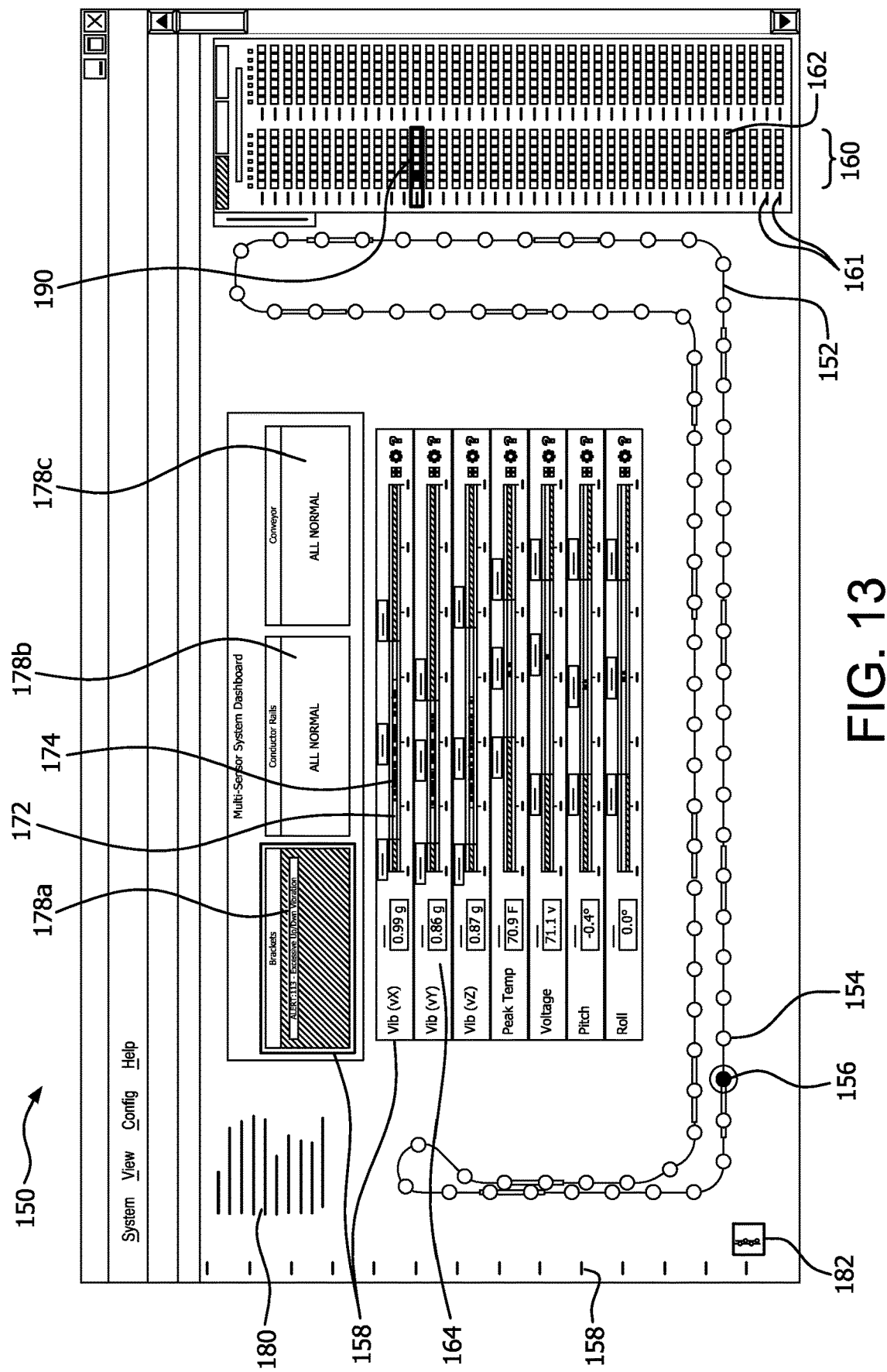
FIG. 13 is an example graphical user interface (GUI) screen generated by a software platform to graphically represent conveyor path sensors and summary measurement data in accordance with an example embodiment.

FIG. 13 is an example graphical user interface (GUI) screen 150 generated by the software platform 16 to graphically represent MSDs 12 (e.g., path sensors 50 deployed in a continuously monitored moving environment) and a summary of related sensor data in accordance with an example embodiment. The GUI screen 150 comprises a generated scaled graphic of path 152 showing icons 154 that represent moving path sensors 50, for example. In accordance with the software platform 16, an IMD 18 can generates a different icon 156 or changes a characteristic thereof for a path sensor experiencing a threshold event. For example, the icon for the path sensor experiencing a threshold event can be flashed, shown with altered brightness and/or have a different color than an icon 154. Thresholds for at least some of the sensor data collected at each MSD 12 can be system configurable. An IMD 18 operating in accordance with the software platform 16 determines when the thresholds are exceeded by received sensor data from the MSDs 12 and generates an alert (e.g., replace an icon 154 with a different icon 156) via its display. In addition, the GUI screen 150 can be generated by the IMD 18 to have a detailed threshold event data section.

The detailed threshold event data section 158 can comprise, for example, for each sensor measurement type listed at 164, an average value 166 and an annotated scale 168 with data points showing minimum and maximum values and tick marks 169 representing current and previous measurement values or data points 176 of respective MSDs 12, and optional colors or shading. For example, a first color or brightness 170 is used for measurement values outside a range delineated by the displayed minimum and maximum threshold parameter values, which can be system configurable thresholds set by a user, or system-learning data values determined by the platform 16 from past data to be consistent with data signatures signifying a designated event for preventive maintenance. The area in the scale 168 and indicated at 172 indicates an acceptable range of sensed data values based on user-defined thresholds. The area in the scale 168 and indicated at 174 represents a range of actual sensed data points. An outlier data point in the areas outside area 172 provide a visual indication to the user 18. Also, the user can click and slide the ends of the area 172 to change the acceptable threshold range to see which MSDs 12 fall within them and they will be indicated in the threshold event data summary section 160 described below, giving the user 18 immediate feedback of MSD 12 statuses. The various thresholds for the various sensor measurements from the devices 12, 14 can be discerned by the system 10 to differentiate alert conditions among different components such as the brackets 30, the rails 32 and the conveyor 28 and to generate an indication of overall component health within the system by changing an indicator 178a,b,c from a first color or brightness to a different color or brightness (e.g., green to red) The GUI screen 150 also provides an alphanumeric data summary 180 and a button 182 that allows a user to switch from the graphical representation of the monitored environment to the blueprint of the monitored system.

In accordance with an example embodiment, an IMD 18 operating in accordance with the software platform 16 generates an advantageous threshold event data summary section 160 in a GUI screen (e.g., layered with the scaled graphic of the path 152, or on a different GUI screen) that provides a quick visual reference to real-time conditions of a relatively large plurality of MSDs 12 based on their sensor data. For example, the threshold event data summary section 158 can be represented as a thresholds indicator stack 162 comprising respective rows 161 per MSD 12 ID. Each row 161 has icons 162 (e.g., a small square or dot) for each of several sensor measurement types (e.g., sensed bracket 30 data such as vibration values in X, Y and X axes, temperature, brush voltage, orientation in pitch and roll directions, and so on). An IMD 18 operating in accordance with the software platform 16 determines when the thresholds are exceeded by received sensor data from the MSDs 12 in their respective HTML video and data file and generates an alert by changing the corresponding icon 162 (e.g., changing its color from green to red or other color change, flashing the icon 162, and/or changing brightness level of the icon 162). An IMD 18 operating in accordance with the software platform 16 can generate a GUI screen or screen portion 200 (FIG. 14A) in response to a user highlighting a row 161, as indicated at 190 in FIG. 13.

Figure 14A:
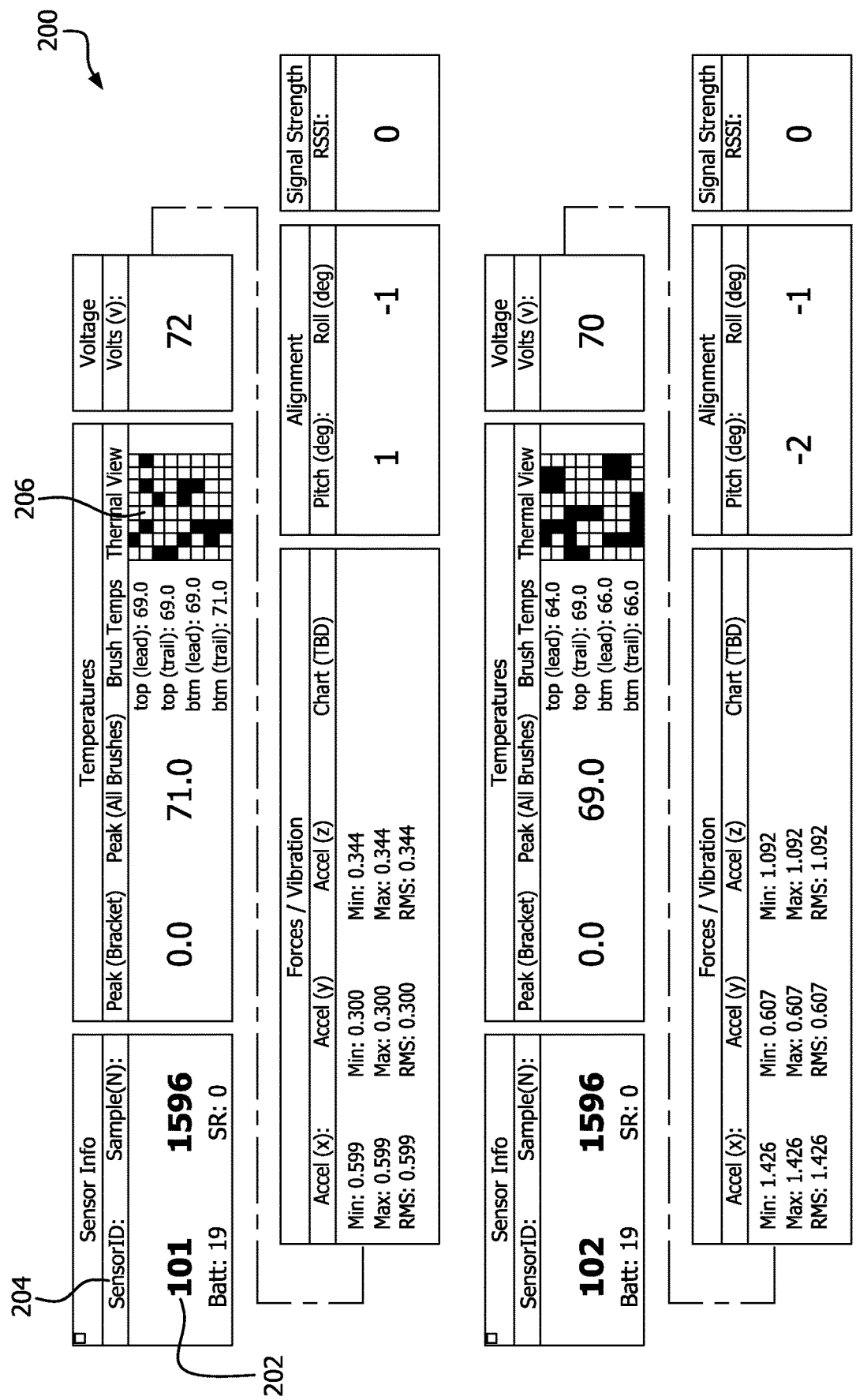

As shown in FIG. 14A, the GUI screen or screen portion 200 comprises an enlarged view of rows 202 of sensed data for respective MSDs 12 that include the MSDs RFID ID or other identifier. Each row 202 provides different types of sensed measurements indicated at 204 and corresponding sensed data values from that MSD 12 such as, for a path sensors 50 on brackets 30, a sample number among the sampled data from that MSD 12, peak bracket temperature, peak brush 34 temperature (all four brush heads), respective temperatures for the brushes on the brush heads 34, a thumbnail image of the thermal view from the thermal FOV sensor 70, forces/vibration data indicating acceleration in X,Y and Z axes including minimum, maximum and root mean square (RMS) values, alignment data including pitch and roll measured in degrees from the 3D angle sensor 68, signal strength of the wireless communication interface 88, and so on. In accordance with an advantageous feature of example embodiments, a sensed brush temperature grid 94 from a MSD 12 can be used by the IMD 18 to generate a thermal image (e.g., of brush heads 34 or other environment component monitored by a thermal FOV sensor 70 or thermal camera 220) on a display, and provide a corresponding thumbnail image 206 in a row 202 that can be selected by a user to navigate to a larger thermal image generated by the IMD 18 on a display.

Figure 14B:
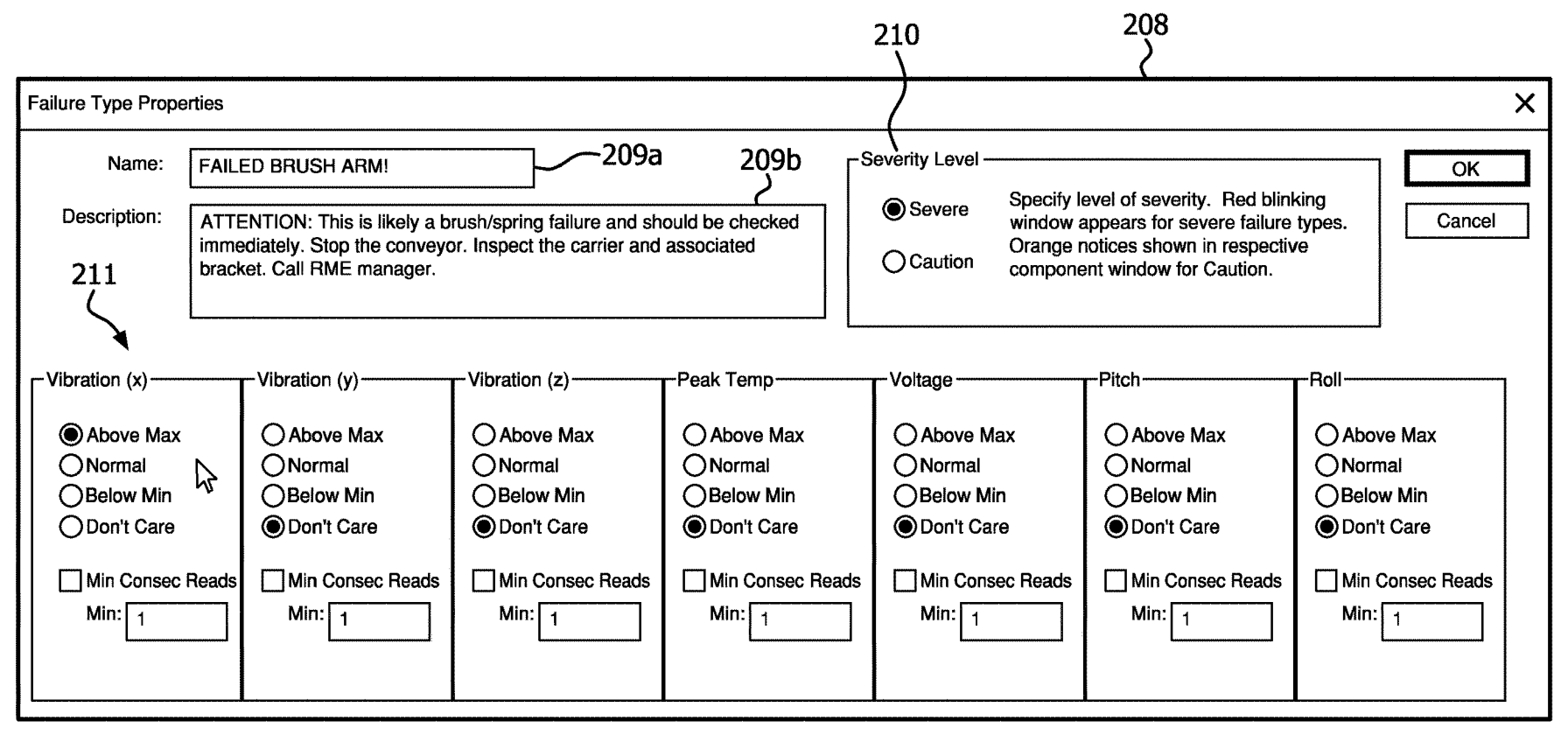

With reference to FIG. 14B, when a threshold event is detected, the base station 18 with software platform 16 can generate a dialog box 208 on the user display that allows a user to name 209a and define 209b the failure and provide instructions within its description 209b for how personnel should respond. The user can select severity level 210, as well as different tolerances of the various sensor measurements, as indicated generally at 211, that correspond to a signature of the threshold event.

Figure 15:
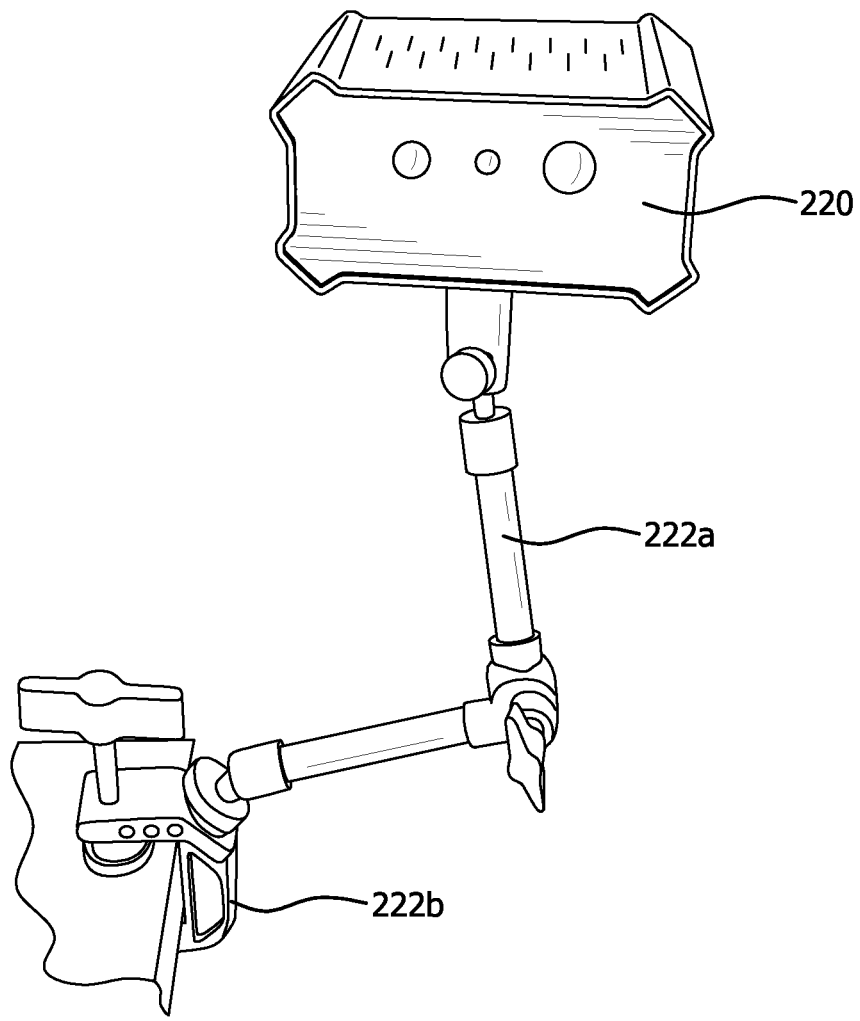
FIG. 15 depicts a smart thermal camera mounted adjacent a conveyor for providing data to a software platform about a portion of the conveyor and its surrounding area in accordance with an example embodiment.

In accordance with another advantageous aspect of the first example embodiment of the industrial IoT system 10 (FIGS. 1 and 12B), a smart thermal and video camera 220 mounted adjacent a conveyor or other feature in a monitored environment. FIG. 15 depicts a smart thermal/video camera 220 mounted adjacent a conveyor 28, for example, for providing data to the software platform 116 about a portion of the conveyor and its surrounding area in accordance with an example embodiment. The smart thermal/video camera 220 can comprise a thermal camera 220a and/or a video camera 220b, a processor and associated memory for processing as indicated at 220c and 220d in FIG. 12B, and a network interface. The camera 220 can have, for example, an articulating arm 222a and mounting hardware (e.g., a C-clamp) 222b for deployment at a selected location in the monitored environment. The camera 220 sends images to the software platform 16. An IMD 18 operating in accordance with the system software platform 16 can generate GUI screens to display sensor data such as the screen 230 depicted in FIG. 16A and the larger view of a portion of the screen 230 provided in FIG. 16B.

Figure 16A:
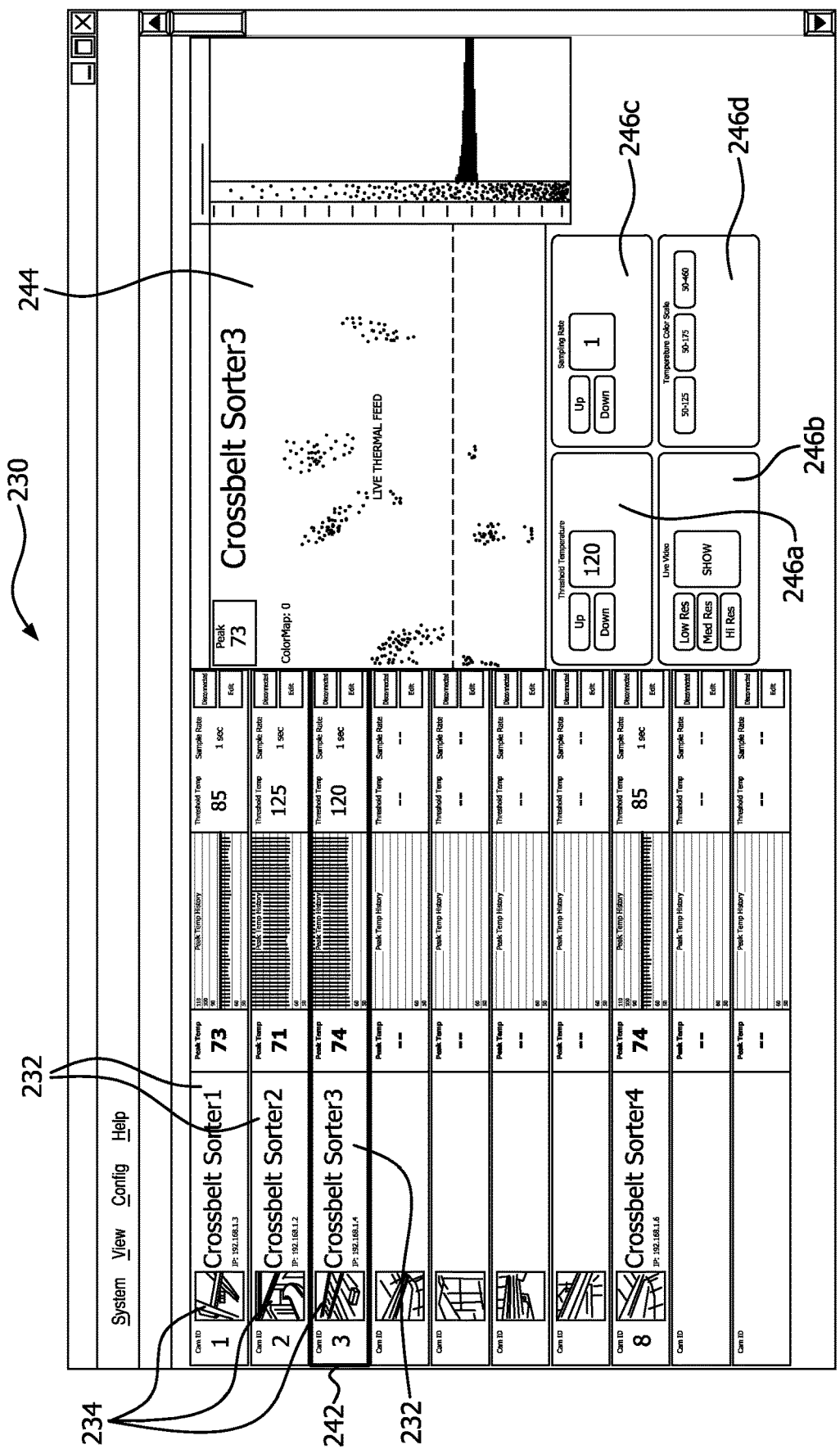
FIG. 16A is an example GUI screen generated by a software platform to graphically represent smart thermal camera measurement data in accordance with an example embodiment.
Figure 16B:
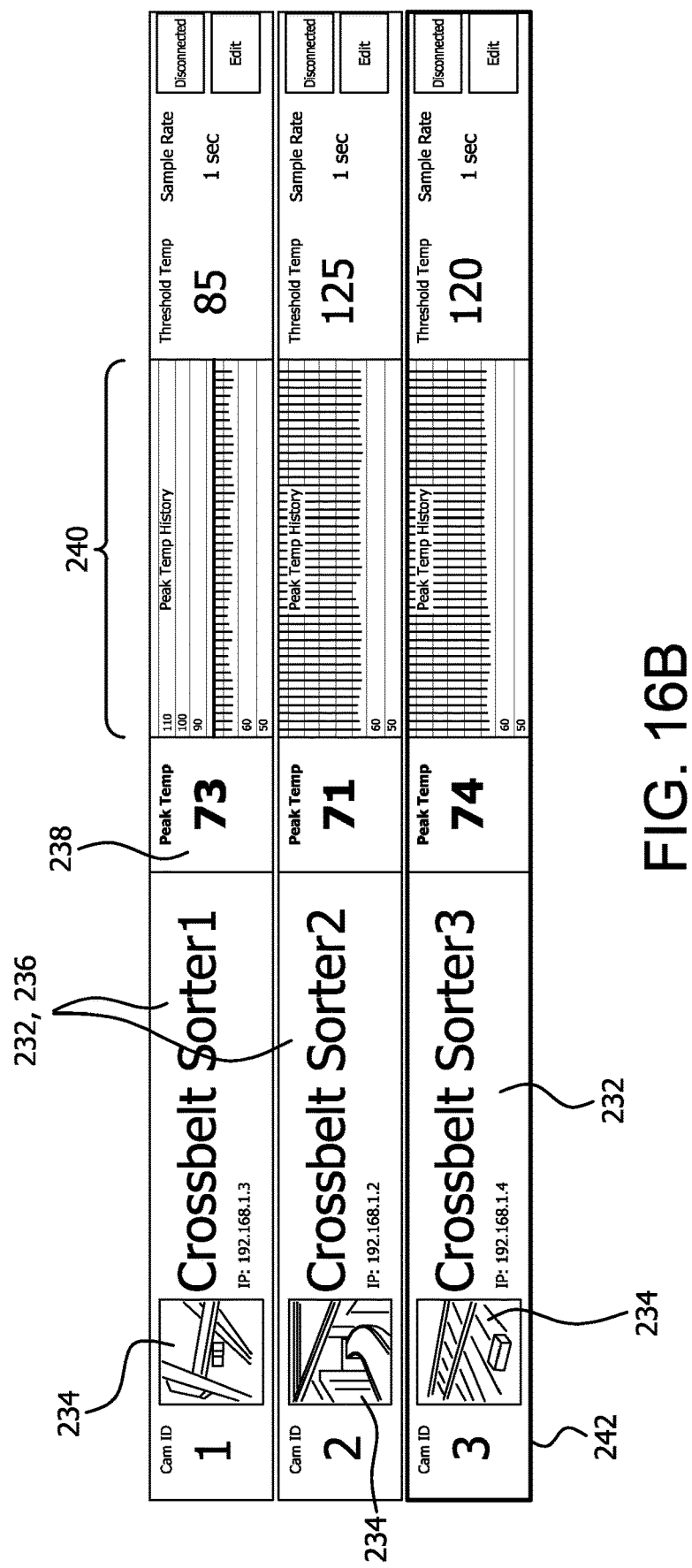
FIG. 16B is an example GUI screen portion generated by a software platform to graphically represent camera image and sensor measurement data in accordance with an example embodiment.

With reference to FIGS. 16A and 16B, the IMD 18 can generate a GUI screen 230 having plural rows 232 for respective cameras 14 (e.g., a smart thermal/video camera 220). Each row can indicate a camera identifier and name 236 of a corresponding system 10 monitored area or part (e.g., can correspond to label on system 10 blueprint). Each row 232 also indicates a peak temperature value 238, a peak temperature history chart 240, threshold temperature, and sample rate, although other sensor data can be included. As indicated at 242, a user can highlight a row 232 to get a real-time enlarged thermal image view as indicated at 244. The portion 244 of the screen 230 provides dual live view of a selected video camera and thermal video feed with full temperature scale and high temperature extraction features. Using buttons indicated at 246b, an IMD 18 user can show the video camera image in the screen portion 144 in place of the thermal image by selecting a live video "SHOW" button and can also select between low, medium and high resolutions. The GUI screen 230 advantageously provides a video image thumbnail 234 in each row 232. The IMD 18 can generate a larger view of the video image in same screen (e.g., in portion 244) or in a different screen when the user selects the image thumbnail 234. In addition, a screen feature can be provided adjacent the video camera and thermal video feed displayed on the GUI screen to allow for play, pause, fast forward and rewind operations.

Buttons indicated at 246a in the GUI screen 230 allow a user to view a currently set temperature threshold (e.g., 120) and to adjust it up or down using the corresponding "UP" and "DOWN" buttons. Similarly, buttons indicated at 246c allow an IMD 18 user to view the current sample rate (e.g., 1) and to adjust it up or down using the corresponding "UP" and "DOWN" buttons. Buttons indicated at 246d allow an IMD 18 user to adjust the temperature color scale on the thermal image (e.g., 50-125 degrees, 50-175 degrees and 50-450 degrees) to improve the ability of the user to discern issues with various monitored equipment subject to different operating conditions and tolerances.

The wireless smart thermal/video camera 220 is advantageous for monitoring full surfaces of large objects, complex machinery, moving machinery and the like. It allows for visual inspection at high speeds and long field of distance. An example use of the wireless smart thermal camera 220 monitoring is large motor and gearbox in a conveyor system. The wireless smart thermal camera 220 can be equipped with wireless integrated high definition (HD) video camera and thermal video sensor with laser alignment guide, and placed relative to the large motor and gearbox installation, to provide non-contact, continuous or periodic, full system temperature monitoring and assessment to detect and report high temperatures exceeding a configured threshold range. Another example is the placement of a wireless smart thermal camera 220 near an industrial pump which can have multiple proximal areas of interest related to respective motors and valves associated with the pump.

Figure 17:
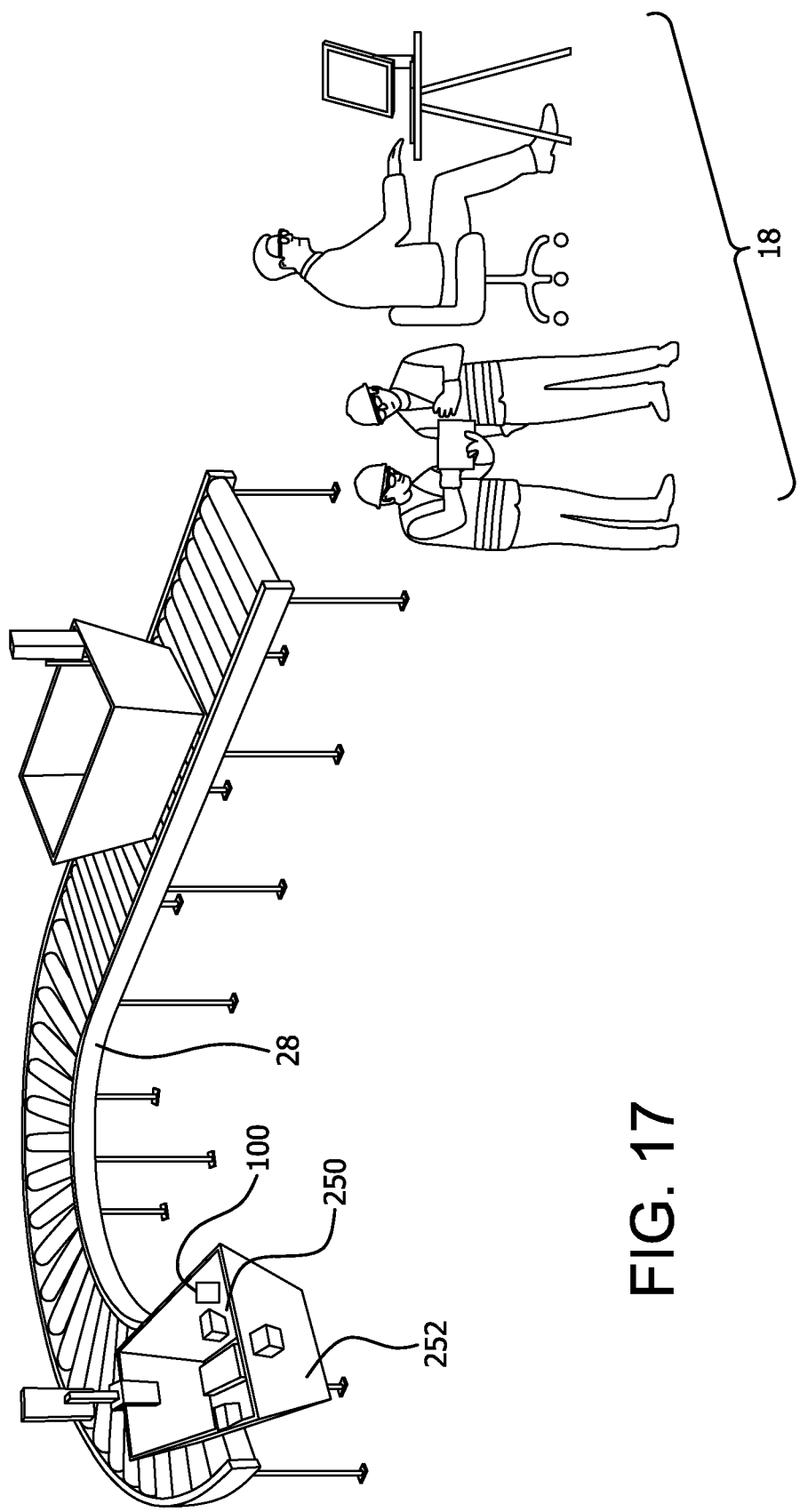
FIG. 17 depicts a multi-sensor sensor device operable as a package sensor constructed in accordance with an example embodiment for conveyance via a conveyor.

FIG. 17 depicts a multi-sensor device 12 operable as a package sensor 250 constructed in accordance with the second example embodiment of the system 10 (e.g., FIG. 12A) to move with a conveyor 28 and allow maintenance personnel to receive conveyor diagnostics information from a first person experience of a package as is travels along a path in a conveyor and sortation system. In accordance with an example embodiment, the packet sensor 250 comprises various cameras and sensors connected via cabling for flexibility in mounting to a crate, tote, tray, box, cart or other carrier frame 252 that is being monitored as it is transported in a particular environment for which diagnostics are desired. As described herein and in accordance with example embodiments, MSDs 12 can be provided as a package sensor 250 (FIG. 17) embedded in a box, tray, carrier tote 252 that is independent from the conveyor 28 and gets occasionally transported by it to generate a single output file after a single-run. Such MSDs 250 are advantageous for conveyor 28 tuning and commissioning, conveyor 28 inspection and diagnostics, inspection and analysis of surrounding areas conditions, and determining impact of conveyor 28 on goods transported by it.

In the illustrated example depicted in FIG. 17, a package sensor 250 is embedded in a frame configuration 252 of choice and placed on a conveyor 28. The package sensor 250 is then activated and commences operations to simultaneously record video, sensor data, sound and thermal data. The package sensor 250 is a multi-camera system that provides layers of synchronized sensor data, video, thermal imaging and threshold analysis. The software platform can generate bookmarks in the threshold analysis to flag selected data points (e.g., departures from configured threshold ranges) for maintenance personnel that occurred within the video produced during its run along the conveyor. The package sensor 250 is programmed to produce a single integrated HTML video and data file for viewing and analysis. The package sensor 250 can be configured to store the recorded data and the integrated video and data file on a local memory device (e.g., a removable memory device such as a MicroSD card). Alternatively, the package sensor 250 can be configured to wirelessly transmit the recorded data to a hub in the software platform 16 and an operator console of the platform can generate the integrated video and data file remotely with respect to the package sensor 250.

Figure 18:
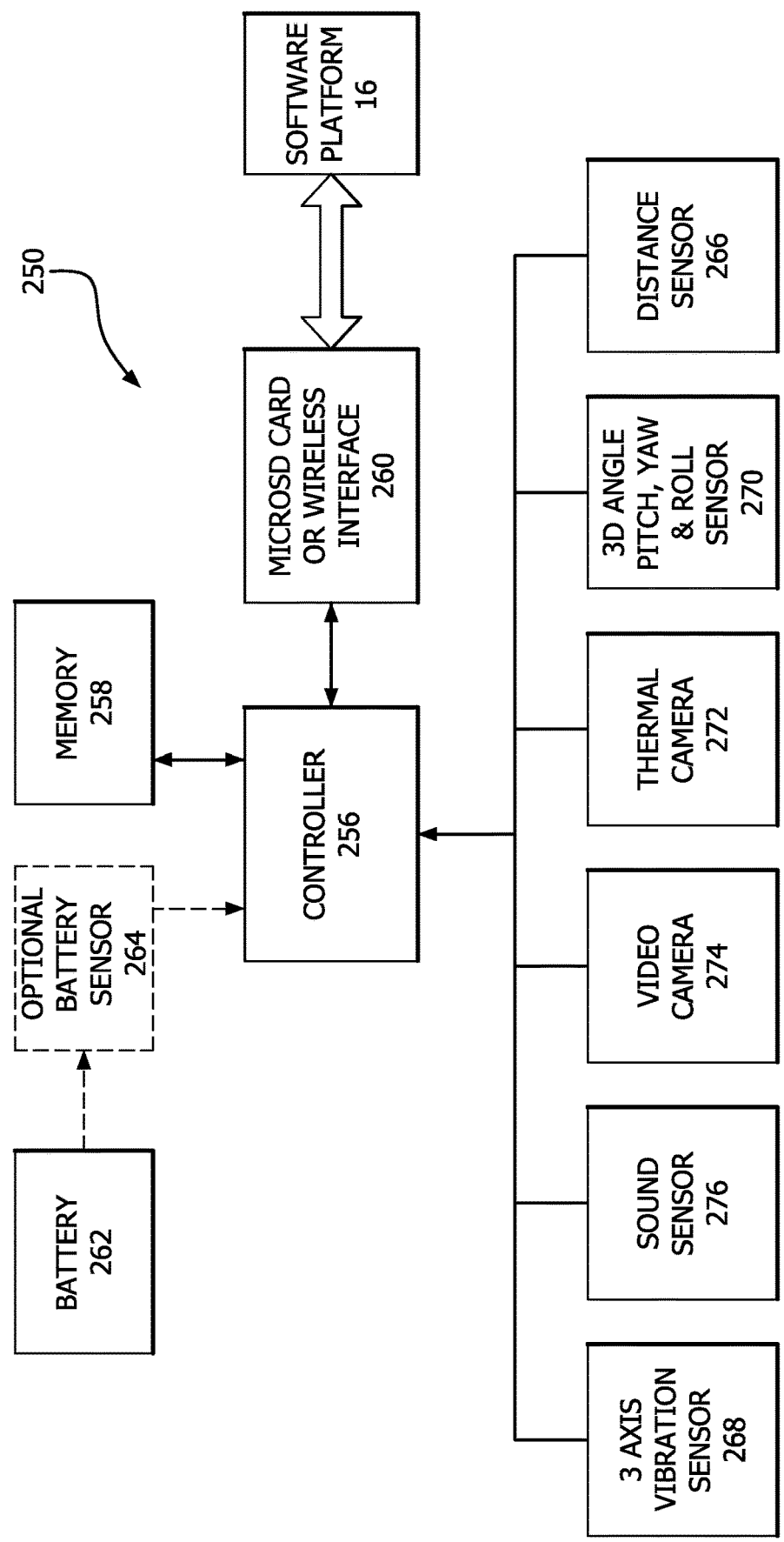
FIG. 18 is a block diagram of a package sensor constructed in accordance with an example embodiment.

FIG. 18 is a block diagram of a package sensor 250 constructed in accordance with an example embodiment. For example, the package sensor 250 is provided with a three-axis vibration sensor 268, a three-dimension angle sensor 270 used for pitch, yaw and roll sensing to facilitate heading sensing and orientation monitoring, a sound sensor 276, a video camera 274, a thermal camera 272 and a distance sensor 266 to detect distance to nearest object in 5-dir (e.g., using LIDAR). The package sensor 250 is also provided with a battery level sensor 264 for detecting the voltage level of the battery 262. As shown in FIG. 17, the package can be provided with an RFID tag 100 or simply an MSD ID embedded in code 101 and wirelessly transmitted with sensor data to the software platform 16 via a wireless interface 260 or stored with the sensor data in a MicroSD card or other memory device 260 and uploaded to an IMD 18. The package sensor 250 is configured to transmit data from its sensors to a user's industrial management device or console 18 running the software platform 16 to provide real-time data on sensed conditions in the system 10. As shown in FIG. 18, the package sensor 250 is provided with a controller 256 and memory 250 for storing program code for operating with the software platform 16 to acquire sensor data and transmit it to the IMD 18 for viewing and analysis and output via an IMD display.

With reference to FIG. 12A, the processor 256 performs data acquisition 103, data processing 104, data synchronization 105 and data rendering 106 operations. For data acquisition 103 and processing 104 operations, the controller 256 receives data from respective sensors 266, 268 and 270 and performs computation, conversions and peak analysis 109 of sensor data. The controller 256 performs audio processing and peak analysis 109 of the sound sensor 276 input, and temperature computation, color-mapping and peak analysis 111 on thermal video input from the thermal camera 272, and frame level decoding/encoding 112 of the thermal video input from the thermal camera(s) 274, and time decoding and synchronization 113 on encoded time received from a real-time clock 275. As indicated at 114, the controller 256 processes RFID tag information received from the reader 102 with correlated indexed location name in a file 107 (e.g., an on-board data file with index of location names and tag identifiers 100). For data synchronization operations 105, the controller 256 performs frame by frame synchronization of processed information for generating a layered frame by frame rendering 123 of processed information into an output video file during data rendering 106. The package sensor 250 is programmed to provide an integrated HTML output file 124A for display of layered MP4 video, for example, with bookmarks for threshold events, and a raw sensor data file 124B for storage and analysis. For example, the controller 256 performs threshold analysis 115 on the processed inputs of the sensors and thermal camera and, when a user defined threshold for a given sensor parameter is exceeded, the controller can generate a bookmark in the video output file comprising the video image 120 indicating the time (e.g., using UTC timestamp 121) at which the threshold event occurred during the sensed package run.

Figure 19A:
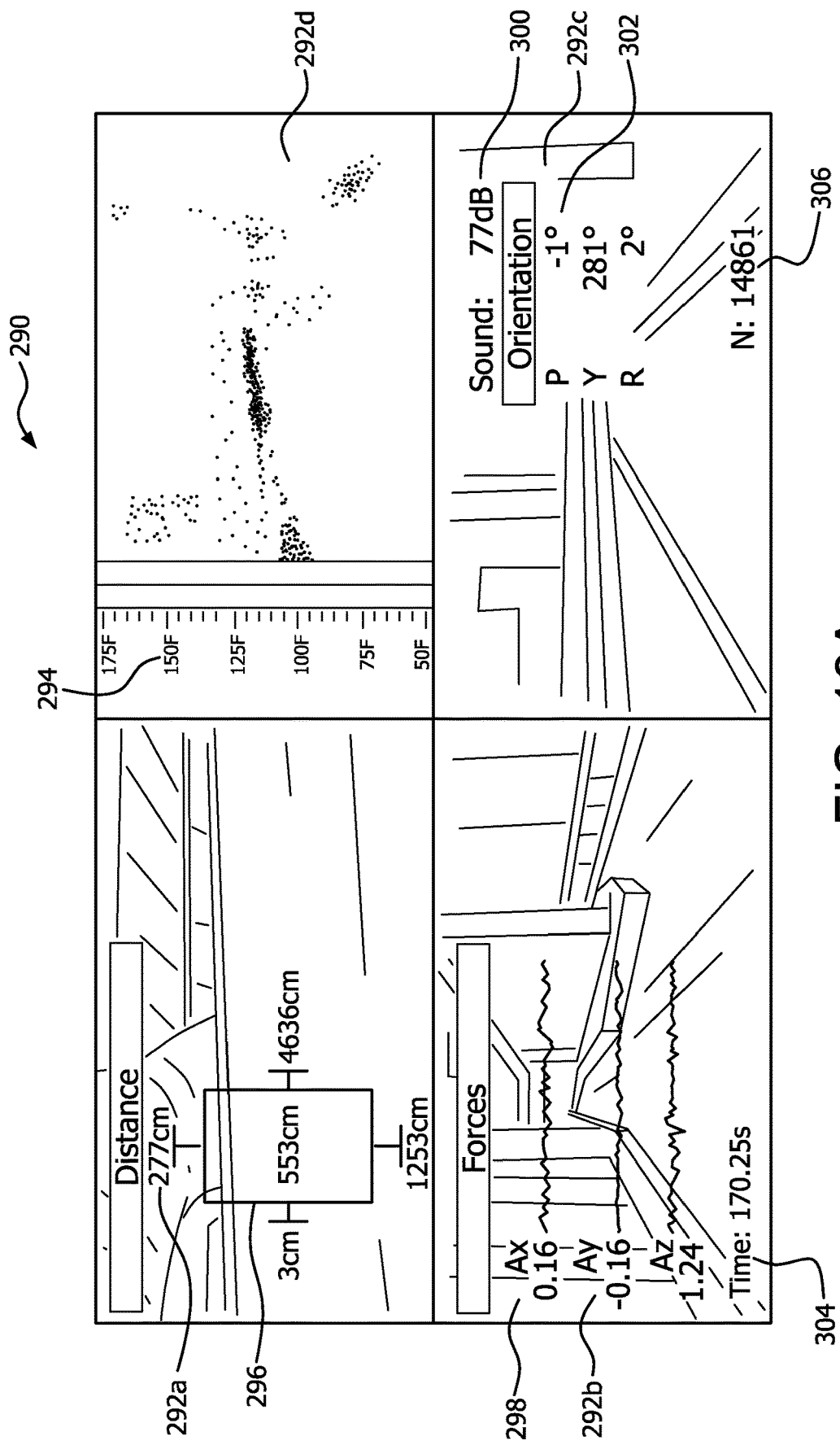
FIG. 19A is an example GUI screen generated by a software platform to graphically represent package sensor measurement data in accordance with an example embodiment.

For example, FIG. 19A is an example GUI screen 290 generated by the software platform 16 to graphically represent package sensor measurement data at an IMD 18 using the file 124A in accordance with an example embodiment. GUI screen 290 represents a synchronized, integrated full screen video output of a MSD 12 implemented as a package sensor 250 and comprises respective synchronized screen image quadrants, including a quadrant 292a having a video image of an area to the right of the package, a quadrant 292b having a video image of an area in front of the package, a quadrant 292c having a video image of an area to the left of the package, and a quadrant 292d having a thermal video 292d. The quadrant 292d can also have indicators that indicate peak temperature and sensor temperature and a temperature scale 294 (e.g., color for 50-175 degrees Fahrenheit for reference when viewing the thermal video. Overlapping the video and thermal videos are alphanumeric sensor data values for distance data 296 to nearest object in 5 directions (e.g., indicated in centimeters as measured from front, top, right, left and rear of package 252), forces/vibration data 298 in three dimensions (e.g., averages in pitch, roll and yaw directions), sound data 300 (e.g., indicated in decibels), and 3D angle orientation data 302 for pitch, roll and yaw directions. All of the sensor data shown in the screen 290 is synchronized by the software platform 116 in the package sensor 250, and a corresponding time stamp 304 and data sample number 306 are also shown in the screen 290.

Figure 19B:
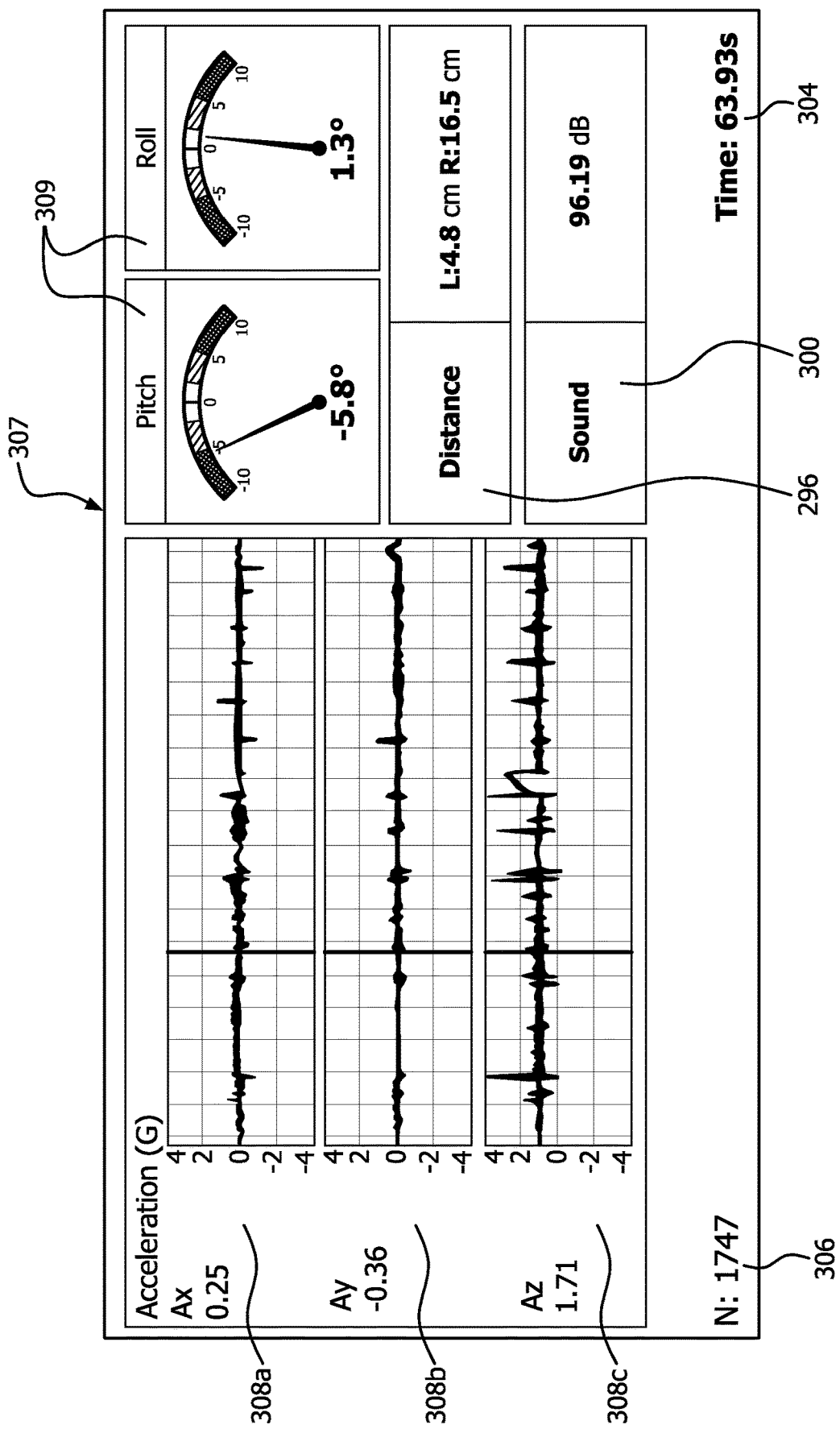
FIG. 19B is an example display generated by a software platform to graphically represent package sensor measurement data in accordance with an example embodiment.

FIG. 19B is an example display or partial display generated by the software platform 16 to graphically represent package sensor measurement data in another format. For example, the IMD 18 can indicate signal traces 308a,b,c representing acceleration in 3-directions (e.g., pitch, roll and yaw), pitch and roll threshold meters 309 and current data points, and other measurements such as distance 296 left and right, and sound level 300.

Figure 20:
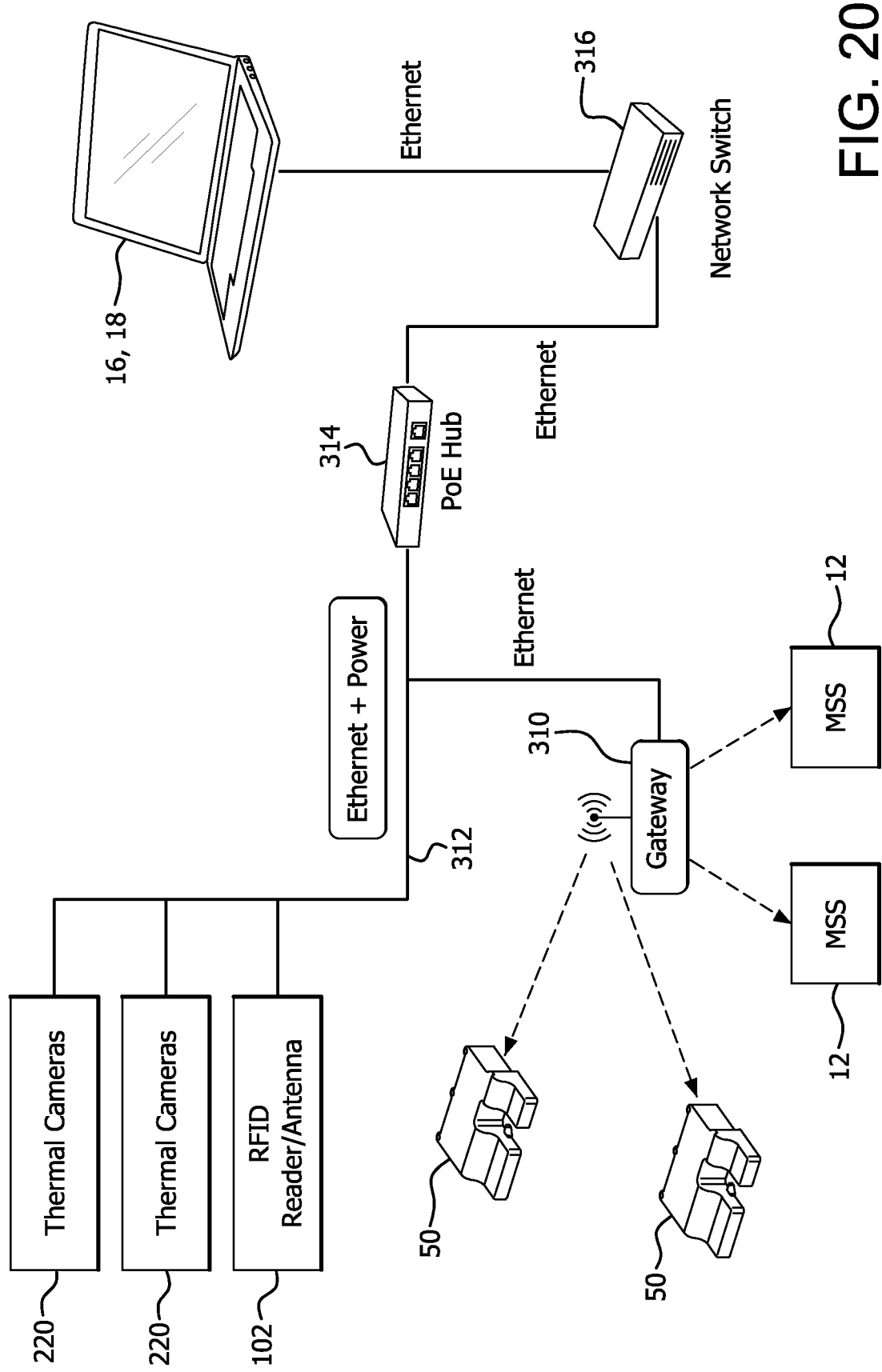
FIG. 20 illustrates an example network topology for connecting different types of multi-sensor devices, cameras and device locator to the software platform in accordance with an example embodiment.

FIG. 20 illustrates an example network topology for connecting different types of multi-sensor devices 12, cameras 14 and device locator 102 to the software platform 16 and IMD(s) 18 in accordance with the first example embodiment of the system 10. For example, thermal/video cameras 220 and an RFID reader and antenna device 102 can be connected via Ethernet with a Power over Ethernet (PoE) 312 to a PoE hub 314. The path sensors 50 and package sensors 250 can be connected to the PoE hub 314 via a wireless gateway 310 (e.g., for wireless 2-way communication using LoRa or WiFi). A network switch 316 connects the PoE hub 314 and the IMD(s)18 operating in accordance with the software platform 16 (e.g., one or more system consoles or workstations or portable devices 18 with IoT system software platform 16). The example network allows connectivity of smart end devices 12 (e.g., path sensors 50 and other sensors 12) and 14 (e.g., thermal/video cameras 220) having adaptable arrays of sensors and the RFID reader and antenna device 102 to a software platform 16 for integrated location tracking of each end device 12, 14, and for a smart hub to receive, control, parse, integrate, present, analyze, learn and notify regarding monitored environment and equipment conditions. The IMD(s) 18 can provide layered synchronized output (e.g., screen 150 in FIG. 13, and screen 230 in FIG. 16A) of captured video, audio, thermal vision, vibration, 3D orientation, distance for nearby objects and location of system 10 equipment and environmental conditions.

Figure 21:
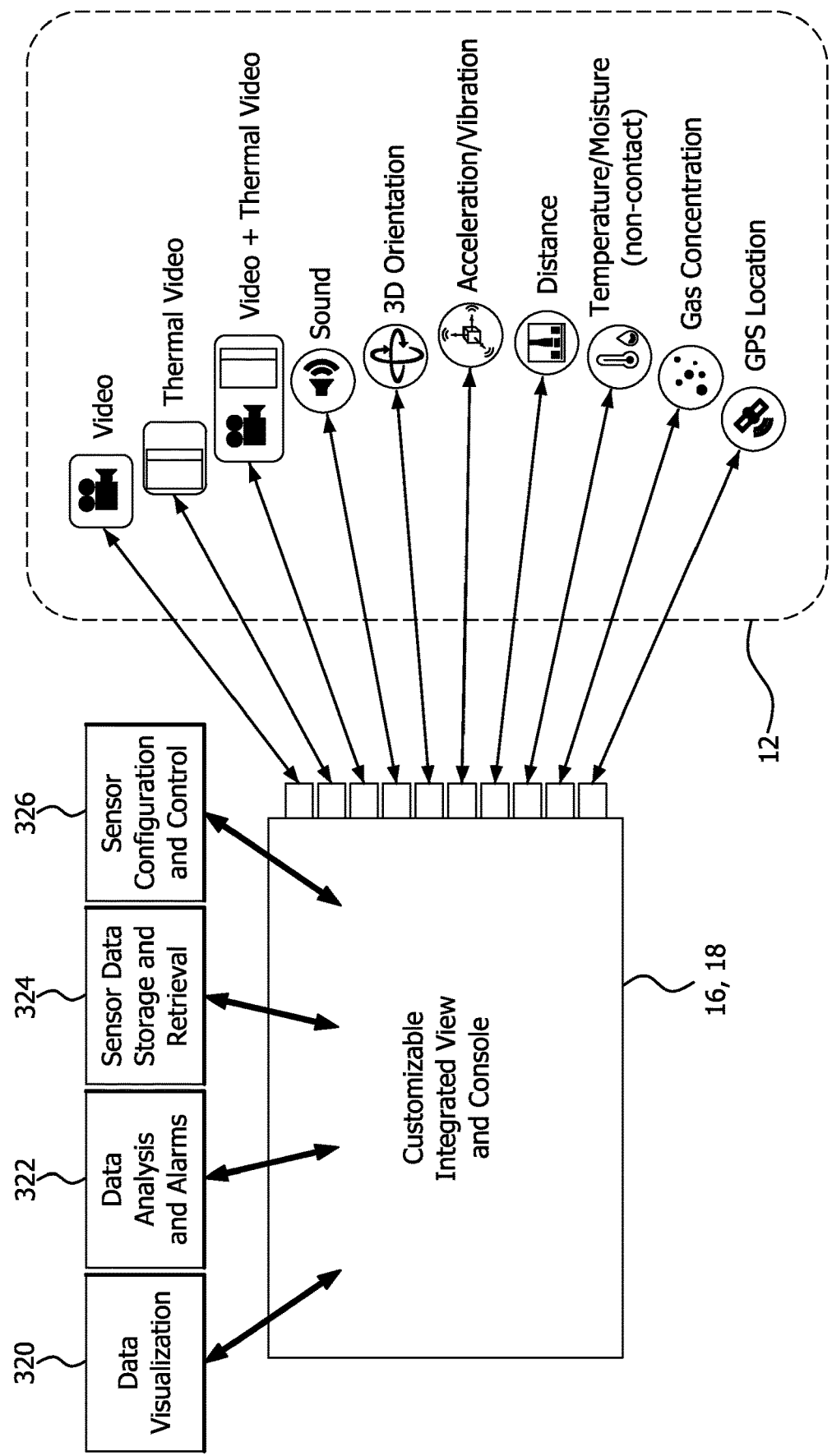
FIG. 21 illustrates example components of the sensor and software platform system in accordance with an example embodiment.

FIG. 21 illustrates example components of the sensor and software platform system 10 in accordance with at least two example embodiments. The system 10 provides a sensor suite and software platform 16 that are used to analyze any object or dynamic environment with an adaptable, integrated suite of advanced wireless sensors 50, 250 and cameras 220. As described above, the MSDs 12,14 in the sensor suite automatically send synchronized compatible sensor and/or video data through gateway(s) to a visualization and control application in the software platform 16. Each device 12,14 can be attached to nearly any object using a set of adaptive interchangeable attachment components. The software platform 16 synchronously integrates all data from the MSDs 12, 14 for live or historic visualization, analysis and storage. Custom interfaces can be developed to accommodate session types, unique sets of sensors, or on the fly with drag and drop pre-configured visualization tools.

For example, software platform 16 components can include, but are not limited to, data visualization 320, data analysis and alarms 322, sensor data storage and retrieval 324 and sensor configuration and control 326. First, layered, multi-sensor synchronized data is provided at the edge of the network. Devices 12, 14 at the network's edge generate video/thermal/sensor data readings at high sample rates to fully describe conditions. The RFID system described above tracks moving parts and provides location of sensors and parts to the software platform 16. Second, smart, two-way communication is provided between the platform 16 and the MSDs 12. Edge devices (e.g., MSDs 12 and cameras 14) send data and listen for instructions from the system console 18 to prioritize, analyze and filter what they send in accordance with the software platform. Thus, the system 10 provides intelligent, multi-mode edge devices 12, 14 that learn to report independently, according to their instructions. Third, the software platform 16 provides machine learning and visualization software. The software platform 16 integrates all sensor data and location information to analyze, present and predict. The software platform 16 can discover patterns and instruct edge devices how to filter and report failure and health modes. The real-time, layered information provided by the software platform 16 is customizable. Simplified diagnostic signatures can be configured, and deeper analytics are provided and are configurable to drill further into data related to the diagnostic signatures. Finally, the software platform 16 can provide cloud access and analytics tools. For example, maintenance personnel can use cloud analytics applications to monitor a conveyor and related equipment and surrounding areas from any location including locations remote from the conveyor site.

Thus, the IMD 18 or system console is configured via the software platform 16 to provide data sampling (e.g., at approximately 75-100 samples per second), layered data visualizations presented on a screen within video, and synchronized frame by frame overlays of data, video, sound and analysis. For example continuous, real-time HTML data and video of outputs or data from edge devices 12,14 can be processed sample by sample with timestamps. The layered synchronization and HTML embedded synchronization and playback realize several advantages of the IMD 18 and platform 16 such as performing dynamic threshold events monitoring and capture with bookmarks in video, and zoned learning thermal analysis, among other operations.

The example embodiments described herein relate to an industrial IoT system 10 with smart sensor suite 12,14 and interactive software platform 16 to provide a system for monitoring conveyor reliability and predictive maintenance such as inspecting conveyor paths and surrounding areas for deleterious conditions as high heat signatures, excessive vibration/acceleration/forces using video, sound, thermal and other sensor observation and analysis. It is to be understood, however, that the system 10 can be installed in many different types of industrial environments and monitoring many different types of equipment besides conveyor and sortation systems.

The system 10 provides technical solutions such as, but not limited to, inspecting the overall health and tuning of a conveyor, the environment around the conveyor, and areas of conveyors unreachable by maintenance personnel, and providing personnel with first person experiences of the conveyor and a sample package moving along the conveyor to overcome the afore-mentioned technical problems. Example embodiments herein employ multi-sensor devices 12,14 (e.g., deployed as a mobile device 50, 250 along conveyor systems, and as a stationary device 220 throughout areas being monitored) to collect data for predictive maintenance purposes. The MSDs 12, 14 use thermal imaging and processing of thermal data in areas of interest, among other types of sensors, and can learn temperature profiles (e.g., of equipment) in areas of interest in different contexts (e.g., during night-time or other working time periods). The MSDs 12,14 can be used to experience and monitor issues or problem areas that are typical to most conveyor and sortation systems such as, but not limited to, tuning of different types of belts (e.g., speed, acceleration, merge, crossing and diverge belts), belt overtightening or misalignment, motor overheating, roller bearing replacement, guard rail catch points, overhang obstructions, congestion points, belt speed inconsistencies, and surrounding area anomalies.

It will be understood by one skilled in the art that this disclosure is not limited in its application to the details of construction and the arrangement of components set forth in the above description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the illustrative embodiments can be easily construed as within the scope of claims exemplified by the illustrative embodiments by programmers skilled in the art to which the illustrative embodiments pertain. Method steps associated with the illustrative embodiments can be performed by one or more programmable processors executing a computer program, code or instructions to perform functions (e.g., by operating on input data and/or generating an output). Method steps can also be performed by, and apparatus of the illustrative embodiments can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of claims exemplified by the illustrative embodiments. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

Computer-readable non-transitory media includes all types of computer readable media, including magnetic storage media, optical storage media, flash media and solid state storage media. It should be understood that software can be installed in and sold with a central processing unit (CPU) device. Alternatively, the software can be obtained and loaded into the CPU device, including obtaining the software through physical medium or distribution system, including, for example, from a server owned by the software creator or from a server not owned but used by the software creator. The software can be stored on a server for distribution over the Internet, for example.

The above-presented description and figures are intended by way of example only and are not intended to limit the illustrative embodiments in any way except as set forth in the following claims. It is particularly noted that persons skilled in the art can readily combine the various technical aspects of the various elements of the various illustrative embodiments that have been described above in numerous other ways, all of which are considered to be within the scope of the claims.

The invention claimed is:

1. A path sensor for detecting conditions of a designated moving portion of a conveyor, the conveyor portion being energized via brushes that contact a power rail, the path sensor comprising:
a controller; and
a sensor connected to the controller and configured to detect a condition of the brushes;
wherein the sensor is chosen from a thermal sensor and an ozone detector to detect a corresponding one of temperature of the brushes and ozone generated by the brushes; and
wherein the path sensor further comprises a housing configured for mounting to the conveyor to move with the conveyor, and for comprising the sensor.

2. The path sensor of claim 1, wherein the sensor is a thermal sensor, the housing having a view portion thereof that extends over at least part of the brushes and has an aperture therein to provide a field of view for the thermal sensor that encompasses the at least part of the brushes.

3. The path sensor of claim 2, wherein the controller communicates the data received from the thermal sensor to an industrial monitoring device, and the thermal sensor data is used to generate a brush temperature grid comprising a detected temperature for each of a plurality of pixels in the brush temperature grid and a corresponding visual display that differentiates the pixels based on their respective detected temperatures.

4. The path sensor of claim 2, wherein the housing is removably connected to a conveyor bracket and comprises a slot therein that is dimensioned to receive an edge of the conveyor bracket and support the view portion extending beyond the edge.

5. The path sensor of claim 2, wherein the path sensor further comprises an ozone detector, and the view portion of the housing comprises a second aperture to expose the ozone detector to the brushes when the housing is mounted to the conveyor.

6. A path sensor for detecting conditions of a designated moving portion of a conveyor, the conveyor portion being energized via brushes that contact a power rail, the path sensor comprising:
a controller; and
a sensor connected to the controller and configured to detect a condition of the brushes;
wherein the sensor is a thermal sensor, and the path sensor further comprises a housing configured for mounting to the conveyor to move with the conveyor, the housing having a view portion thereof that extends over at least part of the brushes and has an aperture therein to provide a field of view for the thermal sensor that encompasses the at least part of the brushes.

7. The path sensor of claim 6, wherein the controller communicates the data received from the thermal sensor to an industrial monitoring device, and the thermal sensor data is used to generate a brush temperature grid comprising a detected temperature for each of a plurality of pixels in the brush temperature grid and a corresponding visual display that differentiates the pixels based on their respective detected temperatures.

8. The path sensor of claim 6, wherein the housing is removably connected to a conveyor bracket and comprises a slot therein that is dimensioned to receive an edge of the conveyor bracket and support the view portion extending beyond the edge.

9. The path sensor of claim 6, wherein the path sensor further comprises an ozone detector, and the view portion of the housing comprises a second aperture to expose the ozone detector to the brushes when the housing is mounted to the conveyor.

* * * * *